(12) United States Patent
Kanomata et al.

(10) Patent No.: US 9,000,104 B2
(45) Date of Patent: Apr. 7, 2015

(54) POLYARYLENE SULFIDE

(71) Applicant: Toray Industries, Inc., Tokyo (JP)

(72) Inventors: Akinori Kanomata, Nagoya (JP); Shunsuke Horiuchi, Nagoya (JP); Shu Kaiho, Nagoya (JP); Koji Yamauchi, Nagoya (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 14/296,869

(22) Filed: Jun. 5, 2014

(65) Prior Publication Data

US 2014/0288263 A1    Sep. 25, 2014

Related U.S. Application Data

(62) Division of application No. 13/882,411, filed as application No. PCT/JP2011/074940 on Oct. 28, 2011, now Pat. No. 8,785,571.

(30) Foreign Application Priority Data

Oct. 29, 2010 (JP) .................. 2010-243412
Mar. 30, 2011 (JP) .................. 2011-075315
Jul. 26, 2011 (JP) .................. 2011-162782

(51) Int. Cl.
C08G 75/14 (2006.01)
C08G 75/02 (2006.01)

(52) U.S. Cl.
CPC .............. *C08G 75/14* (2013.01); *C08G 75/02* (2013.01)

(58) Field of Classification Search
CPC ........... C08G 75/0218; C08G 75/0222; C08G 75/0236; C08G 75/024
USPC ....................................... 528/388
See application file for complete search history.

(56) References Cited

U.S. PATENT DOCUMENTS

| | | | |
|---|---|---|---|
| 3,524,835 A | 8/1970 | Edmonds, Jr. | |
| 5,264,538 A | 11/1993 | Mullins et al. | |
| 5,354,841 A | 10/1994 | Geibel et al. | |
| 5,380,819 A * | 1/1995 | Nishihata et al. | 528/336 |
| 5,384,391 A | 1/1995 | Miyata et al. | |
| 5,440,009 A | 8/1995 | Ash et al. | |
| 5,786,422 A * | 7/1998 | Mizutani et al. | 525/64 |
| 5,811,492 A * | 9/1998 | Mori et al. | 525/92 R |
| 5,869,599 A | 2/1999 | Hay et al. | |
| 8,329,832 B2 | 12/2012 | Horiuchi et al. | |
| 8,440,784 B2 | 5/2013 | Kaiho et al. | |
| 2010/0068518 A1 | 3/2010 | Honma et al. | |

FOREIGN PATENT DOCUMENTS

| | | |
|---|---|---|
| JP | 45-003368 B | 2/1970 |
| JP | 02-282763 A | 11/1990 |
| JP | 03-088828 A | 4/1991 |
| JP | 05-105757 A | 4/1993 |
| JP | 05-163349 A | 6/1993 |
| JP | 05-301962 A | 11/1993 |
| JP | 07-102064 A | 4/1995 |
| JP | 11-286548 A | 10/1999 |
| JP | 2008-201885 A | 9/2008 |
| WO | 2007/034800 A1 | 3/2007 |

OTHER PUBLICATIONS

Dean A. Zimmerman et al., "Polymerization of Poly(p-phenylene sulfide) from a Cyclic Precursor," POLYMER, 1996, vol. 37, No. 14, pp. 3111-3116.

* cited by examiner

*Primary Examiner* — Mike M Dollinger
(74) *Attorney, Agent, or Firm* — DLA Piper LLP (US)

(57) ABSTRACT

A polyarylene sulfide includes 0.01 to 5 mol %, per mol of arylene sulfide structural units, of a function group selected from the group consisting of an amino group, a carboxyl group, a hydroxyl group, an acid anhydride group, an isocyanate group, an epoxy group, a silanol group, and an alkoxysilane group having a dispersity represented by (weight average molecular weight)/(number average molecular weight) of 2.5 or less and a weight loss ratio at 100° C. to 330° C. of 0.2% by weight or less when the polyarylene sulfide is subjected to thermogravimetric analysis from 50° C. to 340° C. at a temperature ramp-up rate of 20° C./min under a non-oxidative atmosphere of normal pressure.

1 Claim, No Drawings

POLYARYLENE SULFIDE

TECHNICAL FIELD

This disclosure relates to polyarylene sulfides having a functional group.

BACKGROUND

Polyarylene sulfide typified by polyphenylene sulfide (this may hereinafter be abbreviated as "PPS") is a resin having properties suitable as engineering plastics such as excellent heat resistance, barrier properties, chemical resistance, electrically insulating property, wet heat resistance, and flame retardancy. It can be molded into various molded components, films, sheets, fibers and so on by injection molding or extrusion forming and has been used widely in fields where heat resistance and chemical resistance are required such as various electric/electronic components, machine components and automotive components.

As a concrete method of producing the polyarylene sulfide and as an industrial production method, methods comprising causing an alkali metal sulfide such as sodium sulfide to react with a polyhalogenated aromatic compound such as p-dichlorobenzene in an organic amide solvent such as N-methyl-2-pyrrolidone have been used widely. However, that production method needs the reaction to be carried out at high temperature under high pressure under strong alkali conditions. Moreover, that method has a large process cost problem because it is an energy-intensive process that needs an expensive high-boiling polar solvent such as N-methylpyrrolidone and has a large cost for solvent recovery.

A commercially available polyarylene sulfide obtained by this method contains chlorine in an amount of about 2000 to about 4000 ppm and alkali metal in an amount of about 1000 to about 3000 ppm at the terminals thereof. That deterioration in physical properties such as electric characteristics is caused by the presence of alkali metal salts in a polymer often becomes a problem when the polymer is applied to the field of electric/electronic parts.

Moreover, the polyarylene sulfide obtained by that method is a polymer not high enough in molecular weight to be used for molding applications and has a very wide molecular weight distribution (Mw/Mn) of from 5.0 to 20 and, therefore, the use thereof for molding applications has caused some problems, e.g., sufficient mechanical characteristics are not developed, or much gas component is generated when having been heated, or much component is eluted when having come into contact with a solvent. Therefore, for example, it is necessary to further perform a step of increasing molecular weight such as thermal oxidative crosslinking in the air, and this renders the process complicated and lowers productivity (e.g., JP 45-3368-B (pages 7 to 10)).

Moreover, polyarylene sulfides are engineering plastics excellent in heat resistance, chemical resistance, and flame retardancy and superior in mechanical properties, but they are problematic in that the compatibility with other resins is low and the paintability to molding articles is also low.

For the purpose of improving such problems with polyarylene sulfides, including paintability and compatibility with other resins, many methods of introducing functional groups into polyarylene sulfides are known. For example, there is a method that comprises melt-kneading a polyarylene sulfide prepared by a conventional reaction with a compound having a functional group such as an alkali metal salt of an organic compound and maleic anhydride (for example, JP 11-286548-A (pages 4 to 8) and JP 2-283763-A (pages 2 to 9)).

Alternatively, there is a method that comprises introducing functional groups into a polymer main chain by copolymerizing a functional group-containing polyhalo compound in polymerizing a polyarylene sulfide (e.g., JP 7-102064-A (pages 2 to 6)).

In both the methods, however, an attempt to introduce a sufficiently effective functional group renders the operation complicated. Moreover, the above-described problems with polyarylene sulfides such as gas generation amount, alkali metal content, and chlorine content, have not been solved by those methods.

On the other hand, a method of producing a polyarylene sulfide by heating a cyclic polyarylene sulfide has been disclosed as another method of producing a polyarylene sulfide. That method is expected to afford a polyarylene sulfide that has a high molecular weight and a narrow molecular weight distribution and that exhibits small weight loss when being heated (e.g., WO 2007/034800 (pages 40 to 41) and Polymer, Vol. 37, No. 14, 1996 (pages 3111 to 3116)). However, a polyarylene sulfide to be obtained is expected to have no terminal structure or have a small amount of terminal structure if any because it is obtained as an impurity or obtained by a side reaction or the like in polymerization, and a polymer uncertain in terminal structure or terminal amount will be obtained.

Moreover, there is known a method wherein in the conversion of a cyclic polyarylene sulfide into a polyarylene sulfide, various catalyst components to promote the conversion (e.g., a compound with radical generating capability and an ionic compound) are used (e.g., JP 5-301962-A (pages 2 to 6), JP 5-163349-A (pages 3 to 6) and JP 5-105757-A (pages 2 to 4)). Specifically, there has been disclosed a method in which a cyclic arylene sulfide oligomer is thermally ring-opening polymerized in the presence of an ionic ring-opening polymerization catalyst. That method is expected to afford a polyarylene sulfide having a functional group and having a narrow molecular weight distribution. That method, however, is problematic in that much alkali metal will remain in a polyarylene sulfide to be obtained because an alkali metal salt of sulfur such as a sodium salt of thiophenol is used as a ring-opening polymerization catalyst in the synthesis of the polyarylene sulfide. Moreover, there is a problem that a polyarylene sulfide will have an insufficient molecular weight when attempting to reduce the amount of alkali metal remaining in a polyarylene sulfide by reducing the used amount of a ring-opening polymerization catalyst in that method.

As a method of reducing the amount of alkali metal remaining in a polyarylene sulfide, there has been disclosed a method of producing a polyarylene sulfide wherein a cyclic aromatic thioether oligomer is ring-opening polymerized in the presence of a polymerization initiator that generates a sulfur radical on heating (e.g., Specification of U.S. Pat. No. 5,869,599 (pages 27 to 28)). The content of alkali metal in a polyarylene sulfide to be obtained is expected to be reduced because this method uses a nonionic compound as a polymerization initiator. However, the glass transition temperature of a polyphenylene sulfide to be obtained by that method is as low as 85° C. This is because the polyphenylene sulfide to be obtained is low in molecular weight and the polyphenylene sulfide is broad in molecular weight distribution since it contains much lower molecular weight components. Moreover, since the polymerization initiator to be used in that method is lower in molecular weight and inferior in thermal stability as compared with a polyphenylene sulfide, there is a fear that a large amount of gas is generated when the polyphenylene sulfide produced by this method is heated, and molding processability may be poor.

In the ring-opening polymerization in the methods for producing a polyarylene sulfide of JP 5-301962-A (pages 2 to 6), JP 5-163349-A (pages 3 to 6), JP 5-105757-A (pages 2 to 4) and Specification of U.S. Pat. No. 5,869,599 (pages 27 to 28), it is believed that the use of a high purity cyclic polyarylene sulfide oligomer containing substantially no linear polyarylene sulfide as a monomer source is preferable and only a slight amount of linear polyarylene sulfide is allowed to be present. Since a cyclic oligomer is generally obtained in the form of a mixture with a large amount of linear oligomer, a high degree of purification operation is needed to obtain a high purity cyclic body. This increases the cost of a polyarylene sulfide to be obtained.

It could therefore be helpful to provide an industrially useful polyarylene sulfide having narrow molecular weight distribution, having low gassing property, high molecular weight, and high purity, and having functional groups.

SUMMARY

We provide a method of producing a polyarylene sulfide (c), the method comprising heating a cyclic polyarylene sulfide composition (a) in the presence of 0.1 mol % to 25 mol %, per mol of arylene sulfide structural units, of a sulfide compound (b) having a reactive functional group represented by the following formula (A):

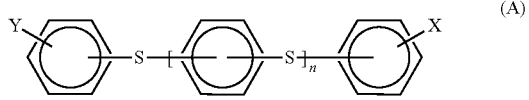

(A)

wherein at least one of Y and X is a functional group selected from among an amino group, a carboxyl group, a hydroxyl group, an acid anhydride group, an isocyanate group, an epoxy group, a silanol group, and an alkoxysilane group, and n represents an integer of 0 to 20.

Moreover, we provide a method of producing a polyarylene sulfide composition (c'), the method comprising further adding a reactive compound (d) to a polyarylene sulfide (c) obtained by the production method mentioned above.

We also provide a polyarylene sulfide, wherein the dispersity thereof represented by (weight average molecular weight)/(number average molecular weight) is 2.5 or less, the weight loss ratio thereof at 100° C. to 330° C. is 0.2% by weight or less when the polyarylene sulfide is subjected to thermogravimetric analysis from 50° C. to 340° C. at a temperature ramp-up rate of 20° C./min under a non-oxidative atmosphere of normal pressure, and the polyarylene sulfide contains 0.01 to 5 mol %, per mol of arylene sulfide structural units, of a functional group selected from an amino group, a carboxyl group, a hydroxyl group, an acid anhydride group, an isocyanate group, an epoxy group, a silanol group, and an alkoxysilane group.

We thus provide an industrially useful polyarylene sulfide narrow in molecular weight distribution, low in gassing tendency, high in molecular weight, and high in purity and having a functional group.

DETAILED DESCRIPTION

Hereinafter, our methods and PPS will be described in detail. The method of producing a polyarylene sulfide is characterized by converting a cyclic polyarylene sulfide composition (a) into a polyarylene sulfide (c) by heating it in the presence of a sulfide compound (b) having a reactive functional group.

(1) Polyarylene Sulfide (c)

The polyarylene sulfide (c) to be obtained in the production method is a homopolymer or copolymer that includes repeating units of a formula —(Ar—S)— as main constitutional units. The main constitutional unit referred to herein means that the constitutional unit is contained in an amount of 80 mol % or more out of all the constitutional units contained in the polymer. Ar includes the units represented by the structural formulae selected from the following formula (C) through formula (M), and the unit represented by formula (C) is particularly preferred.

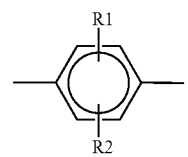

(C)

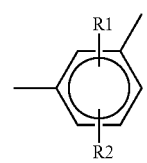

(D)

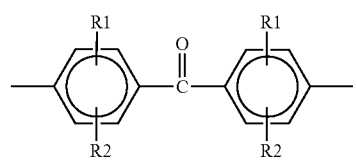

(E)

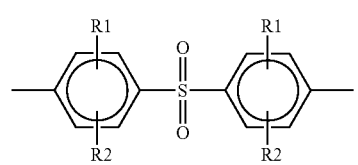

(F)

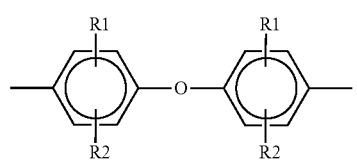

(G)

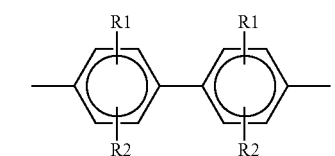

(H)

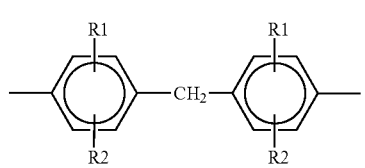

(I)

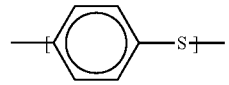

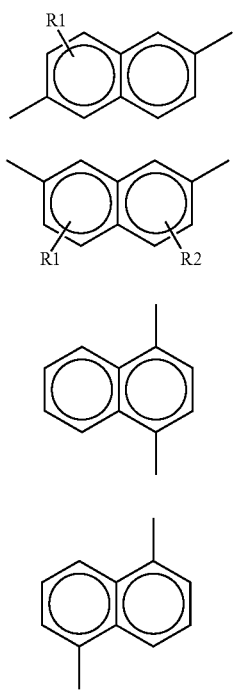

R1 and R2 are substituents selected from among hydrogen, alkyl groups having 1 to 12 carbon atoms, alkoxy groups having 1 to 12 carbon atoms, arylene groups having 6 to 24 carbon atoms, and halogen groups, and R1 and R2 may be the same or may differ.

As long as the above-mentioned repeating units are used as main constitutional units, a few branching units or crosslinking units represented by the following formula (N) to formula (P) can be contained. Preferably, the copolymerized amount of such branching units or crosslinking units is 0 to 1 mol % per mol of the units represented by —(Ar—S)—.

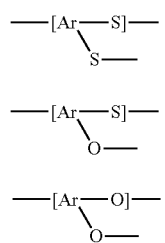

The polyarylene sulfide (c) may be any one of the following: a random copolymer, a block copolymer, and a mixture thereof.

Typical examples of the polyarylene sulfide (c) include polyphenylene sulfide, polyphenylene sulfide sulfone, polyphenylene sulfide ketone, their random copolymers, their block copolymers, and mixtures thereof. Particularly preferable polyarylene sulfides include polyphenylene sulfides (these may hereinafter be abbreviated to PPS) having 80 mol % or more, preferably 90 mol % or more of p-phenylene sulfide units as main constitutional units of the polymer.

According to the method of producing a polyarylene sulfide, a polyarylene sulfide having a higher molecular weight and a narrower molecular weight distribution compared with conventional production methods can be obtained easily by heating a cyclic polyarylene sulfide composition (a) to convert it into a polyarylene sulfide (c).

The degree of the width of the molecular weight distribution of the polyarylene sulfide (c) to be obtained with the production method, that is, the dispersity represented by the ratio of weight average molecular weight to number average molecular weight (weight average molecular weight/number average molecular weight) is preferably 2.5 or less, more preferably 2.3 or less, even more preferably 2.1 or less, and still more preferably 2.0 or less. When the dispersity exceeds 2.5, the amount of the low molecular weight component contained in the polyarylene sulfide remarkably tends to increase. This tends to cause deterioration in mechanical characteristics when the polyarylene sulfide is used for molding applications, the increase of the gas generation amount when heating the polyarylene sulfide, and the increase of the amount of components eluted when the polyarylene sulfide has come into contact with a solvent. The weight average molecular weight and the number average molecular weight can be determined by using an SEC (steric exclusion chromatograph) equipped with a differential refractive index detector.

Although the melt viscosity of the polyarylene sulfide (c) is not particularly limited, a range of 5 to 10,000 Pa·s (measured at 300° C. and a shear rate of 1000 sec-1) can be provided as an example of a preferable range.

The polyarylene sulfide (c) obtained by the method is characterized by being higher in purity compared to polyarylene sulfides obtained by conventional production methods. Specifically, the polyarylene sulfide (c) can have a content of alkali metals, which are impurities, of 500 ppm or less. This is because the desirable production method can perform polymerization by melting and heating the cyclic polyarylene sulfide composition (a) and the sulfide compound (b) having a reactive functional group and can perform polymerization in the absence of metal and solvent in a short time while conventional production methods use a metal sulfide or an alkali metal as a raw material and high temperature, long time conditions are needed in a solvent. The content of alkali metals, which are impurities contained in the polyarylene sulfide, is desirably 500 ppm or less, preferably less than 300 ppm, more preferably 100 ppm or less, and even more preferably 10 ppm or less. An excess of the alkali metal content over 500 ppm increases a possibility that restriction will occur in the application of a polyarylene sulfide, for example, the reliability in the application where high electrical insulating characteristics are required will deteriorate. The alkali metal content of the polyarylene sulfide (c) as used herein is a value calculated from the amount of alkali metal in ash that is a residue resulting from the calcination of the polyarylene sulfide using an electric furnace or the like; the ash content can be determined by analyzing by, for example, ion chromatography or atomic spectrometry.

Although the "alkali metal" refers to lithium, sodium, potassium, rubidium, caesium, and francium, which are of the Group 1 of the periodic table, the polyarylene sulfide preferably contains no alkali metal other than sodium. When an alkali metal other than sodium is contained, it tends to have a bad influence on the electrical characteristics and the thermal characteristics of the polyarylene sulfide. Moreover, it may cause increase in the amount of metal eluted when the polyarylene sulfide comes into contact with solvents, and this tendency becomes remarkable when the polyarylene sulfide contains lithium. Incidentally, out of various metals, alkali metals tend to have greater influence to the electric characteristics, the thermal characteristics, and the amount of metal elution of a polyarylene sulfide in comparison with, for example, alkaline earth metals and transition metals. Therefore, it is surmised that the quality of a polyarylene sulfide can be improved by adjusting the content of alkali metals especially out of various metals to within the above-mentioned range.

The polyarylene sulfide (c) preferably has a chlorine atom content of 2000 ppm or less in terms of reduction in environmental load. Although the polyarylene sulfide to be obtained in conventional production methods tends to contain much chlorine because of the use of p-dichlorobenzene as a raw material, our polyarylene sulfide (c) can easily be reduced in content of impurities including chlorine by refining the cyclic polyarylene sulfide composition (a), which is the main raw material. A preferable chlorine atom content is less than 1000 ppm, more preferably 900 ppm or less, and even more preferably 500 ppm or less. Elimination of halogen has recently been promoted especially in the field of electric/electronic industry. For example, some guidelines of electric/electronic parts, including JPCA (ES-1-2003), IEC (61249-2-21), and IPC (4101B), restrict the content of chlorine atoms to 900 ppm or less. The application is expected to be widened to electric and electronic parts by reducing the chlorine atom content of a polyarylene sulfide, which is 2000 to 4000 ppm in conventional commercially available products.

Preferably, the polyarylene sulfide (c) contains substantially no halogens other than chlorine, i.e., fluorine, bromine, iodine, and astatine. When halogens other than chlorine are contained, their unique properties tend to deteriorate the characteristics, e.g., the electrical characteristics and the residence stability, of the polyarylene sulfide.

Unlike polyarylene sulfides obtained by conventional methods, our polyarylene sulfide (c) obtained by our production method has the advantage that it generates little gas during its heat processing because no solvent such as N-methylpyrrolidone is needed in polymerization and no catalyst such as a compound capable of generating radicals or an ionic compound is used.

Desirably, the polyarylene sulfide (c) exhibits a weight loss ratio of 0.2% by weight or less at between 100° C. and 330° C. when thermogravimetric analysis is performed from 50° C. to 340° C. at a temperature ramp-up rate of 20° C./min under a non-oxidative atmosphere of normal pressure. Polyarylene sulfides produced by conventional methods strongly tend to exhibit a weight loss ratio of 0.2% by weight or more because of much inclusion of solvent-derived compounds (e.g., N-methylpyrrolidone, which is usually used as a solvent, and γ-butyrolactone, which is a raw material for N-methylpyrrolidone) or products resulting from thermal decomposition at terminals due to the execution of polymerization at high temperatures using a solvent. In contrast, the polyarylene sulfide (c) contains almost no solvent-derived compounds or terminal decomposition products because polymerization can be performed by heating in a molten state. Main gas components contained in the polyarylene sulfide (c) are low molecular weight components (components having lower molecular weights and oligomers having arylene sulfide units out of cyclic polyarylene sulfides) contained in a reaction mixture that serves as a raw material (i.e., a mixture composed of a cyclic polyarylene sulfide composition (a) and a sulfide compound having a reactive functional group (b)), an unreacted sulfide compound (b), and their decomposition products. The weight loss ratio strongly tends to be 0.2% by weight or less. Partial use of a reduced pressure condition during melt polymerization can reduce the gas component, i.e., weight loss ratio. The weight loss ratio is preferably 0.18% by weight or less, more preferably 0.12% by weight or less, and even more preferably 0.1% by weight or less. The case that the weight loss ratio exceeds 0.2% by weight is undesirable because it has a problem that much gas is generated in molding the polyarylene sulfide. It is undesirable also because the amount of attachment to a spinneret or die in extrusion forming or to a mold in injection molding will increase so that productivity tends to deteriorate.

The weight loss ratio can be determined by common thermogravimetric analysis. A non-oxidative atmosphere of normal pressure is used as the atmosphere in the analysis. The non-oxidative atmosphere is an atmosphere in which the oxygen concentration in the gaseous phase with which a sample comes into contact is 5% by volumes or less, preferably 2% by volume or less, and more preferably is an atmosphere containing substantially no oxygen. The atmosphere containing substantially no oxygen refers to an atmosphere of inert gas such as nitrogen, helium, and argon. Out of these, a nitrogen atmosphere is particularly preferred in terms of economical efficiency and ease of handling. Normal pressure is atmospheric pressure, that is, a pressure of the air in the vicinity of standard state, i.e., a pressure condition near 101.3 kPa in absolute pressure. When the measurement atmosphere is one other than those described above, measurement suitable for practical use of a polyarylene sulfide cannot be performed, for example, the oxidation of a polyarylene sulfide may occur during measurement or the atmosphere is greatly different from the atmosphere to be used practically in the processing of a polyarylene sulfide.

In the measurement of the weight loss ratio, thermogravimetric analysis is carried out by raising the temperature from 50° C. to an arbitrary temperature of equal to or higher than 340° C. at a temperature ramp-up rate of 20° C./min. Preferably, thermogravimetric analysis is carried out by raising the temperature at a temperature ramp-up rate of 20° C./min after holding the temperature at 50° C. for 1 minute. This temperature range is a temperature region used often in practically using a polyarylene sulfide typified by polyphenylene sulfide and is a temperature region that is used often in melting a polyarylene sulfide in a solid state and then molding it into an arbitrary shape. The weight loss ratio in such a practical use temperature region relates to the gas generation amount from a polyarylene sulfide in practical use and the amount of a component adhering to a spinneret or a mold during molding. Therefore, a polyarylene sulfide low in weight loss ratio within such a temperature range would be a superior polyarylene sulfide of high quality. The measurement of the weight loss ratio is preferably performed using a sample amount of about 10 mg and the shape of the sample is preferably a fine granular form of about 2 mm or less.

One of the features of the polyarylene sulfide (c) obtained by our production method is that an arbitrary reactive functional group can be introduced quantitatively to the terminals of the polyarylene sulfide. The reactive functional group to be introduced is a group selected from among an amino group, a carboxyl group, a hydroxyl group, an acid anhydride group, an isocyanate group, an epoxy group, a silanol group, and an alkoxysilane group. Since being conceivable to be effective for, e.g., an alloy of other resins, the reactive functional group to be introduced is more preferably a group selected from among an amino group, a carboxyl group, and a hydroxyl group.

Usually, the terminal groups of polyarylene sulfides obtained by conventional production methods are mainly chlorine, alkali metal, or a nitrogen compound, and in some cases, a carboxyl group, a hydroxyl group, an amino group, or the like is contained as a by-product. However, the content thereof is very small. Therefore, if it becomes possible to introduce the above-described reactive functional groups in a fixed amount, improvement in functionality such as improvement in the characteristics of a polyarylene sulfide, improvement in paintability, and improvement in compatibility with other resins, can be expected. The polyarylene sulfide (c) obtained by our production method can be expected to be developed to many applications to which polyarylene sulfides produced by conventional production methods were difficult to be developed.

The amount of the reactive functional group introduced is preferably 0.01 to 5 mol %, more preferably 0.05 to 3 mol %, and most preferably 0.1 to 2.7 mol % per mol of the arylene sulfide structural unit of the polyarylene sulfide (c). When the content of reactive functional group terminals is 0.01 mol % or less, it is difficult to obtain the effect of the reactive functional group terminal, whereas when the content is 5 mol % or more, the weight average molecular weight of the resulting polyarylene sulfide will become as low as about 10000 so that moldability in processing is low and characteristics such as mechanical strength or chemical resistance of a molded article deteriorate.

The polyarylene sulfide (c) can be controlled with respect to its crystallization rate and molecular weight (melt viscosity) by controlling the type and the introduced amount of terminal groups. The polyarylene sulfide (c) is useful in that reactivity can be imparted thereto when it is alloyed with other thermoplastic resins or the like because a functional group has been introduced.

The conversion ratio of a cyclic polyarylene sulfide to a polyarylene sulfide in the production method is preferably 70% or more, more preferably 80% or more, and even more preferably 90% or more in obtaining a polyarylene sulfide having the above-described characteristics.

(2) Cyclic Polyarylene Sulfide Composition (a)

The cyclic polyarylene sulfide composition (a) in the method for producing a polyarylene sulfide is a composition comprising a cyclic polyarylene sulfide represented by the following formula (B):

(B)

Preferably, the cyclic polyarylene sulfide contains 80 mol % or more of repeating units —(Ar—S)— in the constitutional units thereof.

Although Ar may be units represented by the above-provided formula (C) to formula (M), formula (C) is particularly preferable.

The cyclic polyarylene sulfide of the above-provided formula (B) may be a random copolymer, a block copolymer, or a mixture thereof comprising two or more types of repeating units selected from the above-provided formula (C) to formula (M). Typical examples thereof include a cyclic polyphenylene sulfide, a cyclic polyphenylene sulfide sulfone, a cyclic polyphenylene sulfide ketone, a cyclic random copolymer thereof, a cyclic block copolymer thereof, and a mixture thereof. A particularly preferable cyclic compound of the formula (B) may be a polyphenylene sulfide comprising 80 mol % or more, especially 90 mol % or more, of p-phenylene sulfide units

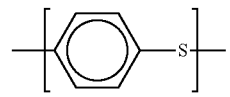

as main constitutional units.

Although the number m of repetition in the formula (B) contained in the cyclic polyarylene sulfide is not particularly limited, it is preferably 4 to 50. The upper limit of the number m of repetition is preferably 25 or less, more preferably 15 or less. Preferably, conversion of the cyclic polyarylene sulfide to the polyarylene sulfide by heating is preferred at or above a temperature at which the reaction mixture containing the cyclic polyarylene sulfide melts as described below. Since an increase in the number m of repetition tends to lead to an increase in the melting temperature of the cyclic polyarylene sulfide, it becomes advantageous to adjust m to within the above-mentioned range from the standpoint that it becomes possible to perform the conversion of the cyclic polyarylene sulfide to the polyarylene sulfide at a lower temperature. It is more desirable that the lower limit of the number m of repetition is 8 or more because if so, the reactivity of the cyclic polyarylene sulfide tends to be high.

The cyclic polyarylene sulfide of the formula (B) contained in the cyclic polyarylene sulfide composition (a) may be either a single compound having a single number of repetition or a mixture of cyclic compounds differing in the number of repetition. The mixture of cyclic compounds differing in the number of repetition is preferred because it tends to be lower in melting temperature than the single compound having a single number of repetition and therefore the temperature to be used in performing the conversion to the polyarylene sulfide (c) can be lowered more.

The cyclic polyarylene sulfide composition (a) may be a mixture containing a component other than the cyclic polyarylene sulfide of the formula (B). The cyclic polyarylene sulfide of the formula (B) must be contained in an amount of at least 50% by weight and it is preferably in an amount of 70% by weight or more, more preferably 80% by weight or more, and even more preferably 90% by weight or more. Although the upper limit of the content of the cyclic polyarylene sulfide contained in the cyclic polyarylene sulfide composition (a) is not particularly limited, an example of a preferable range is up to 98% by weight, more preferably up to 95% by weight. Usually, the higher the weight ratio of the cyclic polyarylene sulfide in the cyclic polyarylene sulfide composition (a) is, the higher the molecular weight of the polyarylene sulfide (c) to be obtained after heating tends to be. In other words, the molecular weight of the polyarylene sulfide (c) to be obtained can be adjusted easily by adjusting the weight ratio of the cyclic polyarylene sulfide in the cyclic polyarylene sulfide composition (a). Moreover, when the weight ratio of the cyclic polyarylene sulfide in the cyclic polyarylene sulfide composition (a) exceeds the above-mentioned upper limit, the melting temperature of the reaction mixture tends to become high. Therefore, the adjustment of the weight ratio of the cyclic polyarylene sulfide to within the above-described range is desirable because it can lower the temperature for converting the cyclic polyarylene sulfide composition (a) into a polyarylene sulfide (c).

Particularly preferably, the component other than the cyclic polyarylene sulfide of the formula (B) in the cyclic polyarylene sulfide composition (a) is a linear polyarylene sulfide oligomer. The linear polyarylene sulfide oligomer as used herein is a linear homopolymer or co-oligomer comprising repeating units of a formula —(Ar—S)— as main constitutional units, preferably containing 80 mol % or more of the repeating units. Although Ar may be units represented by the above-provided formula (C) to formula (M), formula (C) is particularly preferable.

Typical examples thereof include a polyphenylene sulfide oligomer, a polyphenylene sulfide sulfone oligomer, a polyphenylene sulfide ketone oligomer, a random copolymer thereof, a block copolymer thereof, and a mixture thereof. Examples of a particularly preferable polyarylene sulfide oligomer include polyphenylene sulfide oligomers containing p-phenylene sulfide units in an amount of 80 mol % or more, particularly 90 mol % or more, as main constitutional units of the polymers.

The molecular weight of the linear polyarylene sulfide oligomer is, for example, a molecular weight lower than the polyarylene sulfide and, specifically, it is preferably less than 10,000 in weight average molecular weight.

The upper limit of the molecular weight of the cyclic polyarylene sulfide composition (a) to be used for the production of the polyarylene sulfide (c) is preferably 10,000 or less in weight average molecular weight, more preferably 5,000 or less, and even more preferably 3,000 or less. On the other hand, the lower limit of the molecular weight is preferably 300 or more, more preferably 400 or more, and even more preferably 500 or more.

(3) Sulfide Compound (b)

The sulfide compound (b) in the method for producing a polyarylene sulfide (c) is a sulfide compound having a reactive functional group represented by formula (A):

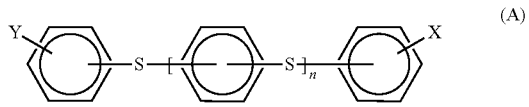

(A)

Herein, at least one of Y and X in the formula is a reactive functional group selected from among an amino group, a carboxyl group, a hydroxyl group, an acid anhydride group, an isocyanate group, an epoxy group, a silanol group, and an alkoxysilane group. Preferably, at least one of Y and X is a functional group selected from among an amino group, a carboxyl group, and a hydroxyl group. Both Y and X may be the above-mentioned reactive functional groups or alternatively one of Y and X may be hydrogen. When both Y and X are reactive functional groups, Y and X may be the same or different.

n represents an integer of 0 to 20. n is preferably an integer of 0 to 15, more preferably of 0 to 10. It is undesirable that n exceeds 20 because this may impair the solubility with a cyclic polyarylene sulfide or a low viscosity property. Moreover, the sulfide compound (b) may partially volatilize and leak to the outside of the system when it is made to react at a temperature equal to or higher than the melting temperature of the reaction mixture. From the viewpoint of improving the introduction efficiency by suppressing the leak to the outside of the system, n is preferably larger than 0 because it is less prone to volatilize on heating. n is preferably within the above-described range because the larger the n becomes, the better the leak of the sulfide compound (b) to the outside of the system is suppressed, but if n is excessively large, the solubility or reactivity with a cyclic polyarylene sulfide may deteriorate. In terms of ease of acquisition, n=0 is preferred.

Such sulfide compounds may be either a single compound or a mixture of two or more compounds.

The amount of the sulfide compound (b) added in the method for producing the polyarylene sulfide (c) is 0.1 mol % to 25 mol %, preferably 0.1 to 15 mol %, more preferably 0.1 to 10 mol %, and particularly preferably 0.1 to 5 mol % per mol of the arylene sulfide structural units of the cyclic polyarylene sulfide composition (a).

When the added amount of the sulfide compound (b) is less than 0.1 mol %, only a small effect will be exhibited so that a polyarylene sulfide similar in characteristics to usual polyarylene sulfide will be obtained. When the added amount exceeds 25 mol %, the resulting polyarylene sulfide may have a reduced molecular weight. The reduction in molecular weight is undesirable because it will cause increase in the amount of gas generation or deterioration in molding processability.

Specific examples of the sulfide compound include bis(2-aminophenyl)sulfide, bis(3-aminophenyl)sulfide, bis(4-aminophenyl)sulfide, bis(2-carboxyphenyl)sulfide, bis(3-carboxy-phenyl)sulfide, bis(4-carboxyphenyl)sulfide, bis(2-hydroxyphenyl)sulfide, bis(3-hydroxy-phenyl)sulfide, bis(4-hydroxyphenyl)sulfide, bis(4-hydroxy-3-methylphenyl) sulfide, 5,5'-thiodisalicylic acid, and 2,2',4,4'-tetrahydroxydiphenylsulfide. Moreover, oligomers having terminal groups the same as these compounds are also included.

As the oligomer, it is possible to use those commonly available and/or synthesized from raw materials. Although the synthesis method is not particularly restricted, it can be obtained by, for example, making a phenyl compound having two thiol groups react with a phenyl compound having a functional group and a halogeno group by heating under a basic condition in a solvent. Typically, examples of the phenyl compound having two thiol groups include 1,2-benzenethiol, 1,3-benzenethiol, 1,4-benzenethiol, 2,4'-thiobisbenzenethiol, and 4,4'-thiobisbenzenethiol. Further, examples of the phenyl compound having a functional group and a halogeno group include o-chlorobenzoic acid, m-chlorobenzoic acid, p-chlorobenzoic acid, o-bromobenzoic acid, m-bromobenzoic acid, p-bromobenzoic acid, o-fluorobenzoic acid, m-fluorobenzoic acid, p-fluorobenzoic acid, o-chloroaniline, m-chloroaniline, p-chloroaniline, o-fluoroaniline, m-fluoroaniline, p-fluoroaniline, o-bromoaniline, m-bromoaniline, p-bromoaniline, o-chlorophenol, m-chlorophenol, p-chlorophenol, o-bromophenol, m-bromophenol, p-bromophenol, o-fluorophenol, m-fluorophenol, and p-fluorophenol.

As the sulfide compound (b), one or more members selected especially from among bis(4-aminophenyl)sulfide, bis(4-carboxyphenyl)sulfide, bis(4-hydroxyphenyl)sulfide, and oligomers thereof are preferred in terms of reactivity and crystallinity. The oligomer as used herein refers to is a sulfide compound represented by the above-provided formula (A), wherein at least one of Y and X is a reactive functional group selected from among an amino group, a carboxyl group, and a hydroxyl group and n represents an integer of 1 to 20. Such compounds may be used either singly or in combination of two or more members thereof.

Method for Producing Polyarylene Sulfide (c)

In the method for the production of a polyarylene sulfide (c), the polyarylene sulfide (c) is obtained by heating the above-described cyclic polyarylene sulfide (a) in the presence of the above-described sulfide compound (b) having a reactive functional group.

Preferably, the heating temperature is a temperature being equal to or higher than the melting temperature of the reaction mixture composed of the cyclic polyarylene sulfide composition (a) and the sulfide compound (b) having a reactive functional group. When the heating temperature is lower than the melting temperature of the reaction mixture, a long time tends to be needed for obtaining a polyarylene sulfide.

Although the temperature at which the reaction mixture of the cyclic polyarylene sulfide composition (a) and the sulfide compound (b) having a reactive functional group melts may vary depending upon the compositions and the molecular weights of the cyclic polyarylene sulfide composition (a) and the sulfide compound (b) and the environment at the time of heating, it is possible to catch the melting temperature by, for example, analyzing the reaction mixture with a differential scanning calorimeter. The lower limit of the heating temperature is, for example, 180° C. or higher, preferably 200° C. or higher, more preferably 220° C. or higher, and even more preferably 240° C. or higher. Within such a temperature range, the cyclic polyarylene sulfide composition (a) and the sulfide compound (b) melt so that a polyarylene sulfide (c) can be obtained in a short time. On the other hand, when the temperature is excessively high, the sulfide compound (b) tends to be more prone to volatilizing to the outside of the system or undesirable side reactions typified by a crosslinking reaction or a decomposition reaction tend to be more prone to occurring, and the characteristics of the polyarylene sulfide to be obtained may deteriorate or a sufficient amount of functional group terminals may not be introduced. Therefore, it is desirable to avoid a temperature at which such undesirable side reactions remarkably occur. The upper limit of the heating temperature is, for example, 400° C. or lower, preferably 360° C. or lower, and more preferably 340° C. or lower. At a temperature equal to or lower than this temperature, bad influence by undesirable side reactions to the characteristics of a polyarylene sulfide to be obtained tends to be suppressed and a polyarylene sulfide (c) having excellent characteristics can be obtained.

Although the reaction time cannot be fixed because it may vary depending upon conditions including the content, the number (m) of repetition, and various characteristics such as molecular weight of the cyclic compound of the above-provided formula (B) in the cyclic polyarylene sulfide composition (a), the type of the sulfide compound (b) to be used, and the temperature of heating, it is preferable to determine the heating temperature to prevent the above-mentioned undesirable side reactions from occurring as much as possible. The heating time is, for example, 0.01 to 100 hours, preferably 0.05 to 20 hours and, more preferably, 0.05 to 10 hours.

Preferably, the heating of the reaction mixture composed of the cyclic polyarylene sulfide composition (a) and the sulfide compound (b) having a reactive functional group is performed under a condition containing substantially no solvent. When carrying out the heating under such a condition, the temperature can be raised in a short time, the reaction rate is high, and it tends to become easier to obtain a polyarylene sulfide in a short time. The condition containing substantially no solvent indicates that the content of a solvent in a reaction mixture is up to 10% by weight. The content of the solvent is preferably up to 3% by weight and it is more preferable that completely no solvent is contained.

The heating can be performed using any apparatus having a heating mechanism without any particular limitation. For example, it may be performed by, of course, a method using a usual polymerization reaction apparatus and also may be performed within a mold for producing a molded article and may be performed using an extruder or a melt-kneading machine. Conventional methods such as a batch system and a continuous system can be adopted.

The atmosphere to be used in heating a reaction mixture composed of the cyclic polyarylene sulfide composition (a) and the sulfide compound (b) having a reactive functional group is preferably a non-oxidative atmosphere. Regarding the pressure at the time of heating, any condition such as increased pressure, normal pressure, reduced pressure, or combination of increased pressure and the following reduced pressure, can be used. Under any pressure condition, it is preferable to use a non-oxidative atmosphere as the atmosphere in the reaction system. This tends to be able to suppress the occurrence of undesirable side reactions such as a crosslinking reaction and a decomposition reaction.

To perform at least a part of the stages of heating under a reduced pressure condition is preferable because it can further reduce the gas component, i.e., weight loss ratio, of the polyarylene sulfide (c) to be obtained. When adopting a reduced pressure condition, to perform heating under an increased pressure condition or a normal pressure condition and then perform heating under a reduced pressure condition is more preferable from the viewpoint of suppressing a sulfide compound (b) having a reactive functional group volatilize to the outside of the reaction system before it reacts with a cyclic polyarylene sulfide. Moreover, when performing heating under an increased pressure condition or a normal pressure condition and then perform heating under a reduced pressure condition as described above, to reduce the pressure after a sulfide compound (b) has fully reacted with a cyclic polyarylene sulfide is preferable from the viewpoint of being able to introduce reactive functional groups efficiently into a polyarylene sulfide (c) to be obtained because the volatilization of the sulfide compound (b) to the outside of the system can thereby be suppressed greatly. The state where the sulfide compound (b) has fully reacted is preferably a state where the sulfide compound (b) incorporated remains unreacted in the system as little as possible. The amount of the incorporated sulfide compound (b) that remains unreacted in the system is preferably, for example, 5% or less of the amount incorporated, more preferably 2% or less, and particularly preferably 1% or less. Moreover, from the viewpoint of preventing volatilization of an unreacted sulfide compound due to pressure reduction, it is preferred that the amount of reactive functional groups present in the system before the pressure reduction is equivalent to that after the pressure reduction in terms of introduction efficiency. Since the gas component of the polyarylene sulfide (c) to be obtained can be reduced by performing at least part of the stages of the heating under a reduced pressure condition as described above, this reaction condition is very preferable because both reduction in the amount of gas generation and increase in the content of reactive functional groups can thereby be achieved simultaneously.

The non-oxidative atmosphere is such an atmosphere that the gas phase in contact with a reaction mixture has an oxygen concentration of up to 5% by volume, preferably up to 2% by volume, and more preferably contains substantially no oxygen. The atmosphere containing substantially no oxygen is an atmosphere of inert gas such as nitrogen, helium, and argon. Out of these, a nitrogen atmosphere is preferred in terms of economical efficiency and ease in handling.

Normal pressure refers to the atmospheric pressure. "Under a reduced pressure condition" means that the pressure of the system where a reaction is performed is lower than the atmospheric pressure. In the case of performing a reaction under a reduced pressure condition, it is preferable to make the atmosphere within the reaction system become a non-oxidative atmosphere temporarily and then become a reduced pressure condition. The upper limit of the pressure under the reduced pressure condition is preferably 50 kPa or less, more preferably 20 kPa or less, and even more preferably 10 kPa or less. The lower limit of the pressure is preferably 0.1 kPa or more, more preferably 0.2 kPa or more. When the reduced pressure condition is the preferable lower limit or higher, a low molecular weight cyclic compound of the above-provided formula (B) contained in the cyclic polyarylene sulfide composition (a) is less prone to volatilize. On the other hand, when the condition is equal to or lower than the preferred upper limit, undesirable side reactions such as a crosslinking reaction tend to hardly occur.

Heating the reaction mixture may also be performed under an increased pressure condition. When heating is performed under an increased pressure condition, the increased pressure condition is preferably produced after the atmosphere within the reaction system is changed to a non-oxidative atmosphere temporarily. "Under an increased pressure condition" means that the pressure of the system where a reaction is performed is higher than the atmospheric pressure. The upper limit of the pressure is not particularly limited, but it is preferably up to 0.2 MPa in terms of ease in handling a reaction apparatus.

Heating the reaction mixture of the cyclic polyarylene sulfide composition (a) and the sulfide compound (b) may also be performed in the presence of a reinforcing fiber. By performing the conversion of a cyclic polyarylene sulfide into a polyarylene sulfide in the presence of a reinforcing fiber, it is possible to easily produce a composite material structure composed of the polyarylene sulfide and the reinforcing fiber. Such a structure tends to be superior, for example, in mechanical properties to polyarylene sulfide alone because it is reinforced by the reinforcing fiber.

Generally, in producing a composite material structure composed of a resin and a reinforcing fiber, wetting between the resin and reinforcing fiber tends to be inhibited due to increased viscosity achieved when the resin has melted so that a uniform composite material often cannot be produced or expected mechanical properties often cannot be developed. "Wetting" as referred to herein means that there is contact between a fluid such as molten resin and a solid substrate such as a reinforcing fiber with a physical condition being good and maintained so that substantially no air or other gas may be captured between the fluid and the solid substrate. The cyclic polyarylene sulfide composition (a) tends to exhibit good wetting with a reinforcing fiber because its viscosity exhibited when having melted is remarkably lower compared with common polyarylene sulfide. By the method for producing a polyarylene sulfide (c), a cyclic polyarylene sulfide composition (a) and a reinforcing fiber form good wetting and then the cyclic polyarylene sulfide composition (a) is converted into a polyarylene sulfide. Therefore, a composite material structure in which the reinforcing fiber and the polyarylene sulfide have formed good wetting can be obtained easily.

Preferably, the reinforcing fiber is a reinforcing fiber composed of long filaments. Although the reinforcing fiber is not particularly restricted, examples of a reinforcing fiber commonly include fibers being good in heat resistance and tensile strength which are to be used as high performance reinforcing fibers. Examples of the reinforcing fiber include glass fiber, carbon fiber, graphite fiber, aramid fiber, silicon carbide fiber, alumina fiber, and boron fiber. Out of these, most preferred examples are carbon fiber and graphite fiber, which are good in specific strength and specific elastic modulus and are capable of exhibiting remarkable contribution to weight reduction. Regarding the carbon fiber and the graphite fiber, although any type of carbon fiber and graphite fiber can be used depending upon intended applications, high strength, high elongation carbon fiber having a tensile strength of 450 kgf/mm$^2$ and a tensile elongation of 1.6% or more is most suited. In the case of using a long reinforcing fiber, the length thereof is preferably 5 cm or more. Within such a length range, it becomes easy to fully develop the strength of the reinforcing fiber as a composite material. Carbon fiber and graphite fiber may be used in admixture with another reinforcing fiber. The reinforcing fiber is not limited with respect to its shape or arrangement and it can be used, for example, in a single direction arrangement, a random direction arrangement, a sheet form, a mat form, a woven form, or a braid form. Although arrangement in which reinforcing fibers have been aligned in a single direction is most suited especially for applications where specific strength and specific elastic modulus are required to be high, arrangement in a cloth (woven) form, which is easy to handle, is also suitable.

The above-described conversion of a cyclic polyarylene sulfide into a polyarylene sulfide can also be carried out in the presence of a filler. Examples of the filler include non-fibrous glass, non-fibrous carbon, and inorganic filler such as calcium carbonate, titanium oxide, and alumina.

(4) Reactive Compound (d)

Although the polyarylene sulfide (c) produced by the above-described production method has excellent processability and therefore can be applied to various melt molding processes such as injection, extrusion, blowing, and compression, moldability and toughness can be improved more by forming a polyarylene sulfide composition (c') in which a reactive compound (d) has been further added.

Usually, a polymer obtained by heat polymerizing the cyclic polyarylene sulfide composition (a) has no reactive group, an effect of improvement in moldability or toughness cannot be obtained even if it is mixed with a reactive compound. However, since the production method can introduce a reactive group arbitrarily into a polyarylene sulfide (c) to be obtained, various properties such as moldability and toughness can be expected to be improved well by making the resulting polyarylene sulfide (c) react with a reactive compound.

The reactive compound (d) is a compound capable of reacting with a reactive group such as a terminal group of the polyarylene sulfide (c) and has a thickening effect in melting. A representative preferred reactive compound (d) may be a silane coupling agent.

The silane coupling agent referred to herein is an organosilicon compound having a reactive group. Thanks to the reaction of a reactive group of a silane coupling agent with a reactive group contained in a polyarylene sulfide, improvement in the polymer characteristics of the polyarylene sulfide and improvement in the physical properties can be expected.

Examples of the reactive group contained in the silane coupling agent include alkoxy groups such as ethoxy, methoxy, and 2-methoxyethoxy; a vinyl group, an epoxy group, a styryl group, a methacryl group, an acrylic group, an amino group, an ureido group, a mercapto group, a sulfide group, and an isocyanate group. Especially, a silane coupling agent having a group selected from among an epoxy group, an amino group, and an isocyanate group is preferred in terms of the reactivity with the polyarylene sulfide (c).

Specific examples of the silane coupling agent having an epoxy group include 2-(3,4-epoxycyclohexyl)ethyltrimethoxysilane, 3-glycidoxypropylmethyldimetoxysilane, 3-glycidoxypropyltrimetoxysilane, 3-glycidoxypropylmethyldiethoxysilane, and 3-glycidoxypropyltriethoxysilane.

Specific examples of the silane coupling agent having an amino group include N-2-(aminoethyl)-3-aminopropylmethyldimethoxysilane, N-2-(aminoethyl)-3-aminopropyltrimethoxysilane, 3-aminopropyl trimethoxysilane, 3-aminopropyltriethoxysilane, 3-triethoxysilyl-N-(1,3-dimethylbutylidene)propylamine, and N-phenyl-3-aminopropyltrimethoxysilane.

Specific examples of the silane coupling agent having an isocyanate group include 3-isocyanatopropyltriethoxysilane.

Considering the melting temperature of a polyarylene sulfide at the time of adding a silane coupling agent, 2-(3,4-epoxycyclohexyl)ethyltrimethoxysilane, γ-aminopropyltriethoxysilane, and 3-isocyanatopropyltriethoxysilane, which are high in boiling point, are more preferable in terms of introduction efficiency.

Such silane coupling agents may be used singly or two or more of them may be used in admixture or in combination.

Although the added amount of the reactive compound (d) is not particularly limited, it is preferably 0.01 to 5 parts by weight per 100 parts by weight of the polyarylene sulfide (c) in terms of moldability and improvement in toughness.

Although the thickening ratio of the polyarylene sulfide composition (c') after the addition of the reactive compound (d) to the polyarylene sulfide (c) before the addition of the reactive compound (d) is not particularly limited because the desired melt viscosity varies depending upon application, it is preferably 1.01 or more, more preferably 1.05 or more, and particularly preferably 1.10 or more in terms of effects. The thickening ratio referred to herein is a value obtained by dividing the melt mass flow rate (MFR) of only a polyarylene sulfide as standard by the MFR in the event that a silane coupling agent has been added. The method of measuring the melt mass flow rate (MFR) is described in the section of the reactivity test of a polyarylene sulfide provided later. The larger the thickening ratio is, the higher the reactivity between the polyarylene sulfide and the silane coupling agent.

The composition containing the polyarylene sulfide (c) can also be used in combination with various types of filler for the purpose of improving mechanical properties.

The filler is not particularly restricted and examples thereof include fibrous filler and inorganic filler. Examples of the fibrous filler include glass fiber, carbon fiber, graphite fiber, aramid fiber, silicon carbide fiber, alumina fiber, and boron fiber. Out of these, most preferred examples are carbon fiber and graphite fiber, which are good in specific strength and specific elastic modulus and are capable of exhibiting remarkable contribution to weight reduction. Examples of the inorganic filler include silicates such as talc, wollastonite, zeolite, sericite, mica, kaolin, clay, pyrophyllite, bentonite, and alumina silicate; metal compounds such as silicon oxide, magnesium oxide, alumina, zirconium oxide, titanium oxide, and iron oxide; carbonates such as calcium carbonate, magnesium carbonate, and dolomite; sulfates such as calcium sulfate and barium sulfate; glass beads, ceramic beads, boron nitride, silicon carbide, calcium phosphate; hydroxides such as calcium hydroxide, magnesium hydroxide, and aluminum hydroxide; and glass flake, glass powder, carbon black, silica, and graphite.

Without impairing functionality as an additive during molding, thermal stabilizers, UV absorbers, infrared absorbers, organic pigments, inorganic pigments, fluorescent brighteners, lubricants, mold release agents, flame retardants, antibacterial agents, antistatic agents, nucleating agents, water repellent agents, antifungal agents, deodorants, antiblocking agents, and so on can be added.

Moreover, other thermoplastic resin, thermosetting resin, and elastomer can be mixed and used. Examples of the thermoplastic resin include polyethylene, polypropylene, acrylic resin, polyamide, polyphenylene sulfide resin, polyetheretherketone resin, polyester, polysulfone, polyphenylene oxide, polyimide, polyetherimide, and polycarbonate. Examples of the thermosetting resin include phenol resin, melamine resin, polyester resin, silicone resin, epoxy resin, and urethane resin. Examples of the elastomer include polyolefin-based rubber, fluororubber, and silicone rubber.

EXAMPLES

Our methods and PPS are described concretely below with reference to examples. The examples are not limiting, but illustrative.

Measurement of Molecular Weight

Regarding the molecular weights of the polyarylene sulfide and the cyclic polyarylene sulfide, a number average molecular weight (Mn) and a weight average molecular weight (Mw) were calculated in polystyrene equivalent by gel permeation chromatography (GPC), which is a kind of steric exclusion chromatography (SEC). The measurement conditions of GPC are shown below:

Instrument: SSC-7100, Senshu Scientific Co., Ltd.
Column: GPC 3506, Senshu Scientific Co., Ltd.
Eluent: 1-chloronaphthalene
Detector: differential refractive index detector
Column temperature: 210° C.
Pre-thermostat bath temperature: 250° C.
Pump thermostat bath temperature: 50° C.
Detector temperature: 210° C.
Flow rate: 1.0 mL/min.
The amount of sample injection: 300 μL (slurry form: about 0.2% by weight).

Measurement of Conversion Ratio

The calculation of the conversion of cyclic polyphenylene sulfide into polyphenylene sulfide was performed using high-performance liquid chromatography (HPLC) by the method described below.

The product of about 10 mg obtained by heating cyclic polyarylene sulfide was dissolved in about 5 g of 1-chloronaphthalene at 250° C. and then cooled to room temperature so that a precipitate was formed. Using a membrane filter having a pore size of 0.45 μm, 1-chloronaphthalene-insoluble matter was filtered off, affording 1-chloronaphthalene-soluble matter. The amount of unreacted cyclic polyarylene sulfide was quantitatively determined by HPLC determination of the obtained soluble matter, and the conversion ratio of cyclic polyarylene sulfide into polyarylene sulfide was calculated. The measurement conditions of HPLC are shown below:

Instrument: LC-10Avp series manufactured by Shimadzu Corporation
Column: Mightysil RP-18 GP150-4.6 (5 μm)
Detector: photodiode array detector (UV=270 nm)

Measurement of Weight Loss Ratio on Heating of Polyarylene Sulfide

The weight loss ratio on heating of a polyarylene sulfide was measured by using a thermogravimetric analyzer under the following conditions. The sample used was fine particles of 2 mm or less.

Instrument: TGA7 manufactured by PerkinElmer
Measurement atmosphere: under nitrogen flow
Charged sample weight: about 10 mg Measurement Conditions
(a) Temperature was held at a program temperature of 50° C. for 1 minute.
(b) Temperature was raised from the program temperature 50° C. up to 350° C. The temperature ramp-up rate at this time was 20° C./min.

Measurement of Weight Loss Ratio on Heating of Sulfide Compound

The weight loss ratio on heating of a sulfide compound was measured by using a thermogravimetric analyzer under the following conditions. The sample used was fine particles of 2 mm or less or powder.
Instrument: TGA7 manufactured by PerkinElmer
Measurement atmosphere: under nitrogen flow
Charged sample weight: about 5 mg
Measurement Conditions
(a) Temperature was held at a program temperature of 50° C. for 1 minute.
(b) Temperature was raised from the program temperature 50° C. up to 300° C. The temperature ramp-up rate at this time was 20° C./min.

Quantitative Analysis of Alkali Metal Content

Quantitative analysis of the alkali metal contained in a polyarylene sulfide and a cyclic polyarylene sulfide composition (a) was carried out by the following:
(a) Sample was weighed into a quartz crucible and then was incinerated by using an electric furnace.
(b) The incinerated ash was dissolved in concentrated nitric acid and then was diluted with diluted nitric acid to a fixed volume.
(c) The resulting fixed volume liquid was subjected to ICP gravimetric analysis (instrument: 4500 manufactured by Agilent) and ICP emission spectroscopy (instrument: Optima 4300DV manufactured by PerkinElmer).

Quantitative Analysis of Halogen Content

Quantitative analysis of the halogen contained in a polyarylene sulfide and a cyclic polyarylene sulfide composition (a) was carried out by the following:
(a) Sample was burned in a flask filled with oxygen.
(b) The burned gas was absorbed in a solution to prepare an absorbed liquid.
(c) Halogen concentration was quantitatively analyzed by analyzing a part of the absorbed liquid by ion chromatography (instrument: DX320 of Dionex Corporation).

Analysis of Amino Group Content

In the analysis of amino groups introduced into a polyarylene sulfide, a molten film of the polyarylene sulfide was prepared and used for the relative evaluation of the amount of amino groups introduced through the comparison of benzene ring-derived absorption at 1900 $cm^{-1}$ as an internal standard with amino group-derived absorption at 3380 $cm^{-1}$ and 3470 $cm^{-1}$ measured using an FT-IR (Jasco Corporation, IR-810 infrared spectrophotometer).

In the case of measuring using a molten film, a press film was prepared under the following conditions:
(a) A kapton film is spread on an aluminum sheet.
(b) The surface of the kapton film was wiped with acetone and then a sample is put thereon.
(c) Another kapton film is put thereon and another aluminum sheet is further put.
(d) The sample is sandwiched with a press mold having heated at 340° C.
(e) The sample is allowed to stay for 1 minute on the mold and then is pressed at a pressure of 250 kgf.
(f) After pressing for 3 minutes, the sample is taken out together with the kapton films and the aluminum films and then immersed in prepared water and thereby cooled rapidly.

Analysis of Carboxyl Group Content

In the analysis of carboxyl groups introduced into a polyarylene sulfide, a molten film of the polyarylene sulfide was prepared and was used for the relative evaluation of the amount of carboxyl groups introduced through the comparison of benzene ring-derived absorption at 1900 $cm^{-1}$ as an internal standard with carboxyl group-derived absorption at 1730 $cm^{-1}$ measured using an FT-IR (Jasco Corporation, IR-810 infrared spectrophotometer).

Analysis of Hydroxyl Group Content

In the analysis of hydroxyl groups introduced into a polyarylene sulfide, a molten film of the polyarylene sulfide was prepared and was used for the relative evaluation of the amount of hydroxyl groups introduced through the comparison of benzene ring-derived absorption at 1900 $cm^{-1}$ as an internal standard with hydroxyl group-derived absorption at 3400 to 3600 $cm^{-1}$ measured using an FT-IR (Jasco Corporation, IR-810 infrared spectrophotometer).

Quantitative Analysis of Terminal Functional Groups Introduced

Regarding the amount of terminal functional groups introduced into a polyarylene sulfide, a molten film was prepared by mixing a cyclic polyarylene sulfide composition (a) used as a raw material and a sulfide compound (b) having a reactive functional group, and then the amount of functional groups was measured in the way described above by using an FT-IR (Jasco Corporation, IR-810 infrared spectrophotometer). The amount of functional groups was measured by the same way also for the resulting polyarylene sulfide (c), and the amount of terminal functional groups introduced was determined from the comparison of both the amounts of functional groups.

Reactivity Test of Polyarylene Sulfide

In a test of the reactivity between a polyarylene sulfide and a silane coupling agent, a melt mass flow rate (MFR) was measured by using a melt indexer (F-B01, manufactured by Toyo Seiki Seisaku-sho, Ltd.). The method of measuring a melt mass flow rate was performed in the following procedures in accordance with ASTM D-12380-70. The MFR in the case of only a polyarylene sulfide was used as standard. When measuring an MFR in the case of adding a silane coupling agent, the polyarylene sulfide and the silane coupling agent were weighed separately and dry blended before being charged into the melt indexer. A value calculated by dividing the standard MFR by the MFR in the case of adding the silane coupling agent was defined to be a thickening ratio.
(a) 7 g of a powder or pellets of a polyarylene sulfide is weighed.
(b) A silane coupling agent is weighed if necessary, and it is dry blended with the polyarylene sulfide weighed in (a).
(c) The sample dry blended in (b) is charged into a melt indexer having been adjusted to 315.5° C. and is allowed to stay there for 5 minutes.
(d) The discharge time for a prescribed amount under a load of 5 kg is measured and the obtained value is converted into the amount discharged for 10 minutes (g/10 min).

Referential Example 1

Preparation of Cyclic Polyarylene Sulfide Composition

A stainless steel autoclave equipped with a stirrer was used as a reaction vessel. The reaction vessel was charged with 14.03 g (0.120 mol) of a 48% by weight aqueous solution of sodium hydrosulfide, 12.50 g (0.144 mol) of the 48% by weight aqueous solution of sodium hydroxide prepared using 96% sodium hydroxide, 615.0 g (6.20 mol) of N-methyl-2-pyrrolidone (NMP), and 18.08 g (0.123 mol) of p-dichlorobenzene (p-DCB). The inside of the reaction vessel was flushed fully with nitrogen and then the vessel was sealed under a nitrogen gas atmosphere.

While stirring at 400 rpm, the temperature was raised from room temperature to 200° C. over about 1 hour. At this stage, the pressure in the reaction vessel was 0.35 MPa in gauge pressure. Subsequently, the temperature was raised from 200° C. to 270° C. over about 30 minutes. The pressures in the reaction vessel at this stage was 1.05 MPa in gauge pressure. After being held at 270° C. for 1 hour, the temperature was lowered rapidly to near room temperature and then the content was recovered.

The analysis of the obtained content by gas chromatography and high-performance liquid chromatography revealed that the monomer consumption ratio of p-DCB was 93% and the cyclic PPS generation ratio was 18.5% given that all sulfur component in the reaction mixture was converted into the cyclic PPS.

500 g of the obtained content was diluted in about 1500 g of ion exchange water and then filtered with a glass filter having an average opening size of 10 to 16 µm. The component remaining on the filter was dispersed in about 300 g of ion exchange water and was stirred at 70° C. for 30 minutes, and then the operation to perform the same filtration as described above was repeated three times in total so that white solid was obtained. This was vacuum dried at 80° C. overnight, affording dry solid.

The resulting solid was put into an extraction thimble and then Soxhlet-extracted for about 5 hours using chloroform as a solvent so that low molecular weight components contained in the solid were separated.

After the extraction operation, the solid remaining within the extraction thimble was dried at 70° C. overnight under reduced pressure, affording about 6.98 g of off-white solid. As a result of analysis, the absorption spectrum in infrared spectrum analysis revealed that the solid was a compound with a phenylene sulfide structure and the weight average molecular weight thereof was 6,300.

After removal of the solvent from the extract solution obtained by the above-described chloroform extraction operation, about 5 g of chloroform was added to prepare a slurry, which was then dropped to about 300 g of methanol under stirring. The thus-formed precipitate was collected by filtration and vacuum dried at 70° C. for 5 hours, affording 1.19 g of white powder. The absorption spectrum in infrared spectrum analysis confirmed that the white powder was a compound composed of phenylene sulfide units. Further, from mass spectrum analysis of the components resolved by high-performance liquid chromatography (apparatus; M-1200H manufactured by Hitachi, Ltd.) and from the molecular weight information from MALDI-TOF-MS, the white powder was found to be a cyclic polyphenylene sulfide composition containing p-phenylene sulfide units as main constitutional units and comprising about 98% by weight of a cyclic polyphenylene sulfide with the number of repeating units of 4 to 13. GPC measurement revealed that the cyclic polyphenylene sulfide composition was completely soluble in 1-chloronaphthalene at room temperature and had a weight average molecular weight of 900.

Referential Example 2

Preparation of Cyclic Polyarylene Sulfide Composition

A stainless steel autoclave equipped with a stirrer was used as a reaction vessel. The reaction vessel was charged with 118 g (1 mol) of 47% sodium hydrosulfide, 42.3 g (1.01 mol) of 96% sodium hydroxide, 163 g (1.66 mol) of N-methyl-2-pyrrolidone (NMP), 24.6 g (0.30 mol) of sodium acetate, and 150 g of ion exchange water. Heat was added slowly up to 240° C. over about 3 hours under normal pressure with nitrogen being passed therethrough, thereby distilling off 212 g of water and 4.0 g (40.4 mmol) of NMP. Then, the reaction vessel was cooled to 160° C. The scattered amount of hydrogen sulfide was 25 mmol.

Subsequently, 147 g (1.00 mol) of p-dichlorobenzene (p-DCB) and 129 g (1.30 mol) of NMP were further added, and the reaction vessel sealed under a nitrogen gas atmosphere. Under stirring at 400 rpm, the temperature was raised at a rate of 0.6° C./min from 200° C. to 270° C. and a reaction continued at 270° C. for 140 minutes. Then, while cooling to 240° C. over 20 minutes, 18.0 g (1.00 mol) of water was poured into the system and subsequently cooled at a rate of 0.4° C./min from 240° C. to 210° C. Then, cooling to near room temperature rapidly, slurry (A) was obtained.

Slurry (A) was diluted with 400 ml of NMP, affording slurry (B). After 100 g of slurry (B) was heated to 80° C., the solvent and the solid were separated with a screen (80 mesh) so that 75 g of slurry (C) was obtained. Slurry (C) was charged into a rotary evaporator and flushed with nitrogen. Then, the slurry was treated under reduced pressure at 100 to 160° C. for 1.5 hours and treated in a vacuum dryer at 160° C. for 1 hour. The amount of NMP in the resulting solid was 3% by weight.

After 90 g (1.2 times the amount of slurry (C)) of ion exchange water was added to the solid and the solid reslurried by stirring at 70° C. for 30 minutes. This slurry was filtered by suction with a glass filter having an opening size of 10 to 16 µm. 90 g of ion exchange water was added to the resulting white cake which was then reslurried by stirring at 70° C. for 30 minutes, filtered by suction in the same manner as described above, and then vacuum dried at 70° C. for 5 hours. Thus, a polyphenylene sulfide composition was obtained.

A 4 gram portion of the resulting polyphenylene sulfide composition was taken and then soxhlet-extracted with 120 g of chloroform for 3 hours. Chloroform was distilled off from the resulting extract liquid and then 20 g of chloroform was added again to the resulting solid, which was dissolved at room temperature, affording a slurry-like mixed liquid. This was dropped slowly into 250 g of methanol under stirring and a precipitate was filtered by suction with a glass filter having an opening size of 10 to 16 µm. The resulting white cake was vacuum dried at 70° C. for 3 hours, affording a white powder.

The white powder had a weight average molecular weight of 900, a Na content of 4 ppm, a chlorine content of 2.2% by weight, and the contents of alkali metals other than Na and halogen other than chlorine were less than their detection limits. The absorption spectrum in infrared spectrum analysis confirmed that the white powder was a phenylene sulfide.

Further, from mass spectrum analysis of the components resolved by high-performance liquid chromatography and from the molecular weight information from MALDI-TOF-MS, the white powder was found to be a composition composed of a cyclic polyphenylene sulfide with the number of repeating units of 4 to 11 and a linear polyphenylene sulfide with the number of repeating units of 2 to 11, and the weight ratio of the cyclic polyphenylene sulfide to the linear polyphenylene sulfide was found to be about 9:1. This revealed that the resulting white powder was a cyclic polyphenylene sulfide composition containing about 89% by weight of the cyclic polyphenylene sulfide and about 11% by weight of the linear polyphenylene sulfide and being capable of being used suitably for production of the polyarylene sulfide. GPC measurement revealed that the cyclic polyphenylene sulfide composition was completely soluble in 1-chloronaphthalene at room temperature and had a weight average molecular weight of 900.

Reference Example 3

Synthesis of Carboxyl Group-Containing Sulfide Compound

To an eggplant flask equipped with a cooling tube and flushed with nitrogen were weighed and put 0.360 g (15.0 mmol) of NaH, 2.1 g (13.6 mmol) of 4-mercaptobenzoic acid, 0.74 g (6.49 mmol) of difluorobenzene, and 20 ml of 1,3-dimethyl-2-imidazolidinone, which were then stirred at 180° C. under a nitrogen atmosphere for 48 hours.

The resulting reaction liquid was dropped into 40 ml of water in which 0.5 vol % of HCl had been added, followed by filtration. The solid remaining on the filter was subjected repeatedly twice to stirring washing with 200 ml of ethanol and filtration, and the solid remaining on the filter was vacuum dried at 70° C. for 3 hours, affording a white powder.

Using ¹H-NMR (AL-400, manufactured by JEOL Co., Ltd.), analysis was performed using deuterated DMSO as a measurement solvent, at a sample concentration of 10 mg/0.75 ml and 128 accumulations. From an aromatic proton of the main chain and an aromatic proton adjacent to a carboxyl group, and a proton of a carboxyl group, it was confirmed to be a reactive terminal group-containing sulfide compound represented by formula (T):

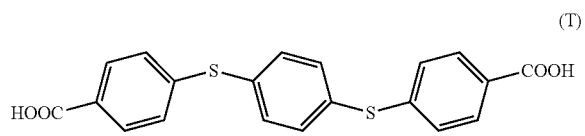 [SMILES: O=C(O)c1ccc(Sc2ccc(Sc3ccc(C(=O)O)cc3)cc2)cc1]

(T)

This sulfide compound was subjected to TGA measurement and it was found thereby that the weight loss ratio on heating from 100° C. to 250° C. was 0.11%. The result and structure are shown in Table 1.

Referential Example 4

Preparation of Cyclic Polyarylene Sulfide Composition

An autoclave equipped with a stirrer was used as a reaction vessel. The reaction vessel was charged with 19.8 kg (0.170 kmol) of 48% sodium hydrosulfide, 14.3 kg (0.172 kmol) of 48% sodium hydroxide, and 100 kg (1.01 kmol) of N-methyl-2-pyrrolidone (this may be hereinafter abbreviated to "NMP"). Heat was added slowly up to about 200° C. over about 2 hours under normal pressure with nitrogen being passed therethrough, thereby distilling off 13.7 kg of water and 12 kg of NMP through a rectifying column. Then, the reaction vessel was cooled to 150° C.

Subsequently, 25.7 kg (0.175 kmol) of p-dichlorobenzene and 264 kg (2.66 kmol) of NMP were added and the reaction vessel sealed under a nitrogen gas atmosphere. Under stirring at 150 rpm, the temperature was raised at an average rate of 1.5° C./min from 150° C. to 250° C., and this temperature was kept for 120 minutes and then cooled to 80° C. so that slurry (A) was obtained. The resulting slurry (A) was separated with a sintered filter having an average opening size of 10 μm so that slurry (B) as a filtrate component and a fine powdery polyarylene sulfide resin as a component remaining on the filter were obtained.

The resulting slurry (B) was charged into a devolatilization apparatus, flushed with nitrogen, and then treated under reduced pressure at 100 to 150° C. for 2 hours, affording a concentrated liquid having about a ¹/₁₀ volume. The concentrated liquid was heated to 80° C., and ion exchange water in an amount of about 25 wt % of the concentrated liquid was added, followed by reslurrying by stirring for 30 minutes. This slurry was filtered by reduced pressure suction with a glass filter having an opening size of 10 to 16 μm. Ion exchange water was added to the resulting cake, which was then reslurried by stirring at 80° C. for 30 minutes, filtered by suction in the same manner as described above, and the same treatment was repeated again. Thereafter, vacuum drying was performed at 150° C. for 6 hours, affording a powder.

This powder had a Na content of 470 ppm and the contents of alkali metals other than Na and halogens other than chlorine were lower than their detection limits. The absorption spectrum in infrared spectrum analysis confirmed that the powder was a polyphenylene sulfide.

Moreover, high-performance liquid chromatography showed that the powder was a cyclic polyphenylene sulfide composition containing about 78% by weight of a cyclic polyphenylene sulfide and being capable of being used suitably for the production of the polyarylene sulfide.

Referential Example 5

Synthesis of Carboxyl Group-Containing Sulfide Compound Oligomer

A three-neck flask equipped with a reflux cooling tube and a nitrogen inlet tube was charged with 15 g (59.9 mmol) of 4,4'-thiodibenzenethiol, 37.5 g (239.6 mmol) of para-chlorobenzoic acid, 36.4 g (263.6 mmol) of potassium carbonate, and 500 g of dehydrated NMP, and was nitrogen-bubbled under stirring to flush the inside of the flask with nitrogen. The temperature was raised to 150° C., and after the arrival at 150° C., heating was continued for 5 hours, followed by cooling to room temperature. The NMP solution after cooling was mixed with 5 l of pure water, and then hydrochloric acid (prepared by diluting 37% hydrochloric acid 10 times with pure water) was added until the solution came to be pH 4. A deposit was collected by filtration, washed again with 5 l of pure water, and then collected by filtration. Thereafter, washing with toluene, washing with methanol, and vacuum drying at 50° C. for 12 hours were carried out so that a brown powder was obtained. From the ratio of the carboxyl group-derived absorption near 1730 cm⁻¹ to the benzene ring-derived absorption at 1900 cm⁻¹ as internal standard by infrared spectroscopic analysis and mass spectrum analysis, the resulting compound was confirmed to be a reactive terminal group-containing sulfide compound represented by formula (U):

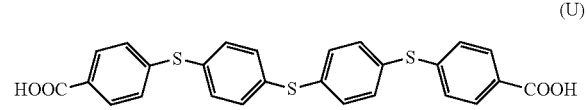 [SMILES: O=C(O)c1ccc(Sc2ccc(Sc3ccc(Sc4ccc(C(=O)O)cc4)cc3)cc2)cc1]

(U)

This sulfide compound was subjected to TGA measurement and it was found thereby that the weight loss ratio on heating from 100° C. to 250° C. was 0.02%, and it had a characteristic of being less prone to volatilize than bis(4- aminophenyl) sulfide, bis(4-hydroxyphenyl) sulfide, thiodisalicylic acid, and the carboxyl group-containing sulfide compound obtained in Referential Example 3. The result and structure are shown in Table 1.

inside of the ampule was flushed with nitrogen. The ampule was put in an electric furnace controlled to 340° C. and heated for 60° C., and then the ampule was taken out and cooled to room temperature so that a black solid was obtained. The

TABLE 1

| | Sulfide compound Structure | Functional group Kind | Weight loss ratio % |
|---|---|---|---|
| Referential Example 3 | HOOC–⟨⟩–S–⟨⟩–S–⟨⟩–COOH | COOH | 0.11 |
| Referential Example 5 | HOOC–⟨⟩–S–⟨⟩–S–⟨⟩–S–⟨⟩–COOH | COOH | 0.02 |
| BAPhS | H2N–⟨⟩–S–⟨⟩–NH2 | NH2 | 0.15 |
| BHPhS | HO–⟨⟩–S–⟨⟩–OH | OH | 0.18 |
| TDSA | HOOC–⟨OH⟩–S–⟨OH⟩–COOH | COOH, OH | 0.16 |

BAPhS: Bis(4-aminophenyl) sulfide
BHPhS: Bis(4-hydroxyphenyl) sulfide
TDSA: Thiodisalicylic acid In the following tables of examples, the concentration of a cyclic polyphenylene sulfide composition (a) is the weight fraction of a cyclic polyphenylene sulfide to the whole cyclic polyphenylene sulfide composition (a). The added amount of a sulfide compound (b) is an added amount per mol of the polyphenylene sulfide structural units of the cyclic polyphenylene sulfide composition (a). The conversion ratio is the conversion ratio of a cyclic polyphenylene sulfide into a polyphenylene sulfide polymer. Molecular weight, Na content, and weight loss ratio are values obtained by measuring a resulting polyphenylene sulfide polymer by the above-described methods, respectively. The functional group content is a value determined by measuring a resulting polyphenylene sulfide polymer by the above-described method, and calculating the content of an amino group, a carboxyl group, or a hydroxyl group.

Example 1

2 g of the cyclic polyphenylene sulfide composition obtained in Referential Example 1 and bis(4-aminophenyl) sulfide in an amount of 19.8 mg (0.5 mol %) per mol of the polyphenylene sulfide structural units of the cyclic PPS composition were mixed. A 500 mg portion was weighed from the mixed powder and then was put into a glass ampule. The product was completely soluble in 1-chloronaphthalene at 250° C. HPLC measurement revealed that the conversion ratio of the cyclic polyphenylene sulfide to PPS was 96.5%. Results are shown in Table 2.

As a result of GPC measurement, a peak derived from the cyclic polyphenylene sulfide and a peak of the generated polymer (PPS) were confirmed. The resulting PPS had a weight average molecular weight of 49,000 and a dispersity of 2.05. The PPS obtained had a Na content of 3 ppm and exhibited a weight loss ratio on heating from 100° C. to 330° C. of 0.078%. The resulting PPS had an amino group content of 0.15 mol % per mol of polyphenylene sulfide structural units. Results are shown in Table 2.

Examples 2 to 6

Operations were carried out in the same manner as in Example 1 except for changing the raw materials as shown in Table 2 so that black solids were obtained. Results are shown in Table 2.

The results of Examples 1 to 6 show that reactive functional group-containing polyphenylene sulfides little in alkali metal content and gas generation were obtained.

Comparative Example 1

Operations were carried out in the same manner as in Example 1 except for adding no sulfide compound (b) so that a black solid was obtained. The product was completely soluble in 1-chloronaphthalene at 250° C. Results are shown in Table 2. The functional group of the resulting polymer (PPS) was not detected and the amount thereof was outside the measurable range (less than 0.01%). This result shows that a reaction of a cyclic polyphenylene sulfide without using a sulfide compound (b) results in very few functional groups contained in a resulting polyphenylene sulfide.

Comparative Example 2

Operations were carried out in the same manner as in Example 1 except for adding 1.0 mol % of sodium salt of thiophenol, which was an ionic initiator instead of the sulfide compound (b) so that a black solid was obtained. The product was completely soluble in 1-chloronaphthalene at 250° C. Results are shown in Table 2. It is shown that in a method using an ionic compound, which is a conventional ring-opening polymerization catalyst, in ring-opening polymerization of a cyclic polyarylene sulfide, a large amount of alkali metal is contained in a polyarylene sulfide obtained.

Example 7

50 g of the cyclic polyphenylene sulfide composition obtained in Referential Example 1 and bis(4-aminophenyl) sulfide in an amount of 250 mg (0.25 mol %) per mol of the polyphenylene sulfide structural units of the cyclic PPS composition were charged into a glass test tube equipped with a distillation tube and a stirring blade. Pressure reduction and nitrogen flushing were repeated three times. Under a nitrogen atmosphere, a band heater was wound on the test tube and the temperature was controlled to 340° C. After heating for 120 minutes, the pressure was reduced and heating was continued for additional 10 minutes at a pressure of 0.1 kPa. Then, the pressure was released, the heater was removed, and the temperature was lowered to room temperature so that a brown solid was obtained. The product was completely soluble in 1-chloronaphthalene at 250° C. The results are shown in Table 3.

The amino group content per mol of polyphenylene sulfide structural units was 0.14 mol %.

Examples 8, 9, Comparative Example 3

Operations were carried out in the same manner as in Example 7 except for changing the raw materials and the

TABLE 2

| | Cyclic polyarylene sulfide composition (a) | | | Sulfide compound (b) | | Reaction conditions | | | Characteristics of polyarylene sulfide | | | | |
|---|---|---|---|---|---|---|---|---|---|---|---|---|---|
| | lot | Concentration | Charged amount | Kind | Added amount | Reaction temperature °C. | Reaction time min | Conversion ratio % | Molecular weight Mw | Mw/Mn | Na content ppm | Weight loss ratio % | Functional group content mol % |
| Example 1 | Referential Example 1 | 98% | 2 g | BAPhS | 0.5 mol % | 340 | 60 | 96.5 | 49000 | 2.05 | 3 | 0.078 | 0.15 |
| Example 2 | Referential Example 2 | 89% | 2 g | BAPhS | 0.5 mol % | 340 | 60 | 91.2 | 43000 | 2.01 | 4 | 0.088 | 0.13 |
| Example 3 | Referential Example 2 | 89% | 2 g | BAPhS | 2.0 mol % | 340 | 60 | 91.3 | 26000 | 1.62 | 3 | 0.115 | 0.60 |
| Example 4 | Referential Example 2 | 89% | 2 g | BHPhS | 0.5 mol % | 340 | 60 | 91.0 | 41000 | 2.08 | 4 | 0.081 | 0.15 |
| Example 5 | Referential Example 1 | 98% | 2 g | Referential Example 3 | 0.5 mol % | 340 | 60 | 96.0 | 29000 | 2.10 | 3 | 0.077 | 0.38 |
| Example 6 | Referential Example 2 | 89% | 2 g | TDSA | 10 mol % | 340 | 60 | 91.2 | 17000 | 1.90 | 4 | 0.101 | 1.0 |
| Comparative Example 1 | Referential Example 1 | 98% | 2 g | — | — | 340 | 60 | 96.5 | 76000 | 2.11 | 3 | 0.068 | <0.01 |
| Comparative Example 2 | Referential Example 1 | 98% | 2 g | TPhNa | 1.0 mol % | 340 | 60 | 95.5 | 37000 | 2.28 | 2010 | 0.251 | 0.3 |

BAPhS: Bis(4-aminophenyl) sulfide
BHPhS: Bis(4-hydroxyphenyl) sulfide
TDSA: Thiodisalicylic acid
TPhNa: Thiophenyl sodium salt reaction conditions as shown in Table 3 so that brown solids were obtained. The results are shown in Table 3.

In Example 8, the hydroxyl group content of 0.20 mol % per mol of polyphenylene sulfide structural units. In Example 9, the salicyl group content of 0.09 mol % per mol of polyphenylene sulfide structural units. In Comparative Example 3, the functional group of the resulting polymer (PPS) was not detected and the amount thereof was outside the measurable range (less than 0.01%).

collected matter subjected to NMP washing three times, water washing three times, and further methanol rinsing and then was vacuum dried at 100° C. for 12 hours, affording powdery PPS. The resulting powdery PPS was found to have a weight average molecular weight of 50,000 and a dispersity of 2.25. MFR measurement of the powdery PPS was carried out under the same conditions as Comparative Example 4. The MFR was 357 g/10 minutes. The results were shown in Table 4.

TABLE 3

| | Raw materials | | | | | | | Characteristics of polyarylene sulfide | | | | |
|---|---|---|---|---|---|---|---|---|---|---|---|---|
| | Cyclic polyarylene sulfide composition (a) | | Sulfide compound (b) | | Reaction conditions | | | | | | | Functional group content |
| | | | | | Reaction temperature | Reaction time | Conversion ratio | Molecular weight | | Na content | Weight loss ratio | |
| | lot | Concentration | Charged amount | Kind | Added amount | ° C. | min | % | Mw | Mw/Mn | ppm | % | mol % |
| Example 7 | Referential Example 1 | 98% | 50 g | BAPhS | 0.25 mol % | 340 | 120 + 10 | 95.7 | 50000 | 2.35 | 3 | 0.085 | 0.14 |
| Example 8 | Referential Example 1 | 98% | 50 g | BHPhS | 0.5 mol % | 340 | 200 + 10 | 98.7 | 54000 | 2.39 | 3 | 0.070 | 0.20 |
| Example 9 | Referential Example 1 | 98% | 50 g | TDSA | 0.25 mol % | 340 | 150 + 10 | 99.8 | 56000 | 2.46 | 3 | 0.091 | 0.09 |
| Comparative Example 3 | Referential Example 1 | 98% | 50 g | — | — | 340 | 110 + 10 | 99.6 | 47000 | 2.34 | 3 | 0.076 | <0.01 |

BAPhS: Bis(4-aminophenyl) sulfide
BHPhS: Bis(4-hydroxyphenyl) sulfide
TDSA: Thiodisalicylic acid Comparative Example 4

Into a 1-liter autoclave were charged 48 g of the PPS obtained in Comparative Example 3 and 500 ml of NMP and stirred at 230° C. for 30 minutes. The resulting slurry was filtered and the collected matter was subjected to NMP washing three times, water washing three times, and further methanol rinsing and then was vacuum dried at 100° C. for 12 hours, affording powdery PPS. The resulting powdery PPS was found to have a weight average molecular weight of 47,000 and a dispersity of 2.32. MFR measurement of the powdery PPS was carried out in accordance with the procedure provided in the above-described reactivity test of a polyarylene sulfide. The MFR was 180 g/10 minutes. The results were shown in Table 4.

Comparative Example 5

MFR measurement was carried out under the same conditions as Comparative Example 4 except for dry blending KBM303 to the powdery PPS obtained in Comparative Example 4. The MFR was 245 g/10 minutes and the thickening ratio to Comparative Example 4 was 0.73%. The results were shown in Table 4.

Example 10

Into a 1-liter autoclave were charged 48 g of the PPS obtained in Example 7 and 500 ml of NMP and stirred at 230° C. for 30 minutes. The resulting slurry was filtered and the Example 11

MFR measurement was carried out under the same conditions as Example 10 except for dry blending KBM403 to the powdery PPS of Example 7 obtained in Example 10. The MFR was 317 g/10 minutes and the thickening ratio to Example 10 was 1.13. The results were shown in Table 4.

Example 12

Into a 1-liter autoclave were charged 48 g of the PPS obtained in Example 9 and 500 ml of NMP and stirred at 230° C. for 30 minutes. The resulting slurry was filtered and the collected matter was subjected to NMP washing three times, water washing three times, and further methanol rinsing and then was vacuum dried at 100° C. for 12 hours, affording powdery PPS. The resulting powdery PPS was found to have a weight average molecular weight of 56,000 and a dispersity of 2.43. MFR measurement of the powdery PPS was carried out under the same conditions as Example 10. The MFR was 565 g/10 minutes. The results were shown in Table 4.

Example 13

MFR measurement was carried out under the same conditions as Example 12 except for dry blending KBM303 to the powdery PPS of Example 9 obtained in Example 12. The MFR was 451 g/10 minutes and the thickening ratio to Example 12 was 1.25. The results were shown in Table 4.

TABLE 4

| | PPS lot | Sulfide compound Kind | Added amount | Silane coupling agent Kind | Added amount | MFR g/10 min | Thickening ratio times |
|---|---|---|---|---|---|---|---|
| Comparative Example 4 | Comparative Example 3 | — | — | — | — | 180 | 1.00 |
| Comparative Example 5 | Comparative Example 3 | — | — | KBM303 | 0.5 wt % | 245 | 0.73 |
| Example 10 | Example 7 | BAPhS | 0.14 mol % | — | — | 357 | 1.00 |
| Example 11 | Example 7 | BAPhS | 0.14 mol % | KBM403 | 0.5 wt % | 317 | 1.13 |
| Example 12 | Example 9 | TDSA | 0.09 mol % | — | — | 565 | 1.00 |
| Example 13 | Example 9 | TDSA | 0.09 mol % | KBM303 | 0.5 wt % | 451 | 1.25 |

BAPhS: Bis(4-aminophenyl) sulfide
TDSA: Thiodisalicylic acid

Comparative Examples 4 and 5 show that when a PPS in which no terminal was detected was used, the viscosity did not increase even though a silane coupling agent was used and, rather, the viscosity decreased. Examples 10 and 11 show that when a PPS having an amino terminal was used, a thickening effect was exhibited by addition of a silane coupling agent. Examples 12 and 13 show that a PPS having a salicyl terminal was used, a thickening effect was exhibited by addition of a silane coupling agent. These results show that functional group terminals introduced during the polymerization of a cyclic polyphenylene sulfide reacted with a silane coupling agent and, as a result, the viscosity increased.

Comparative Example 6

Into a glass ampule was charged 2 g of the cyclic polyphenylene sulfide composition obtained in the Referential Example 1, and the inside of the ampule was flushed with nitrogen. The ampule was put in an electric furnace controlled to 340° C. After heating for 55 minutes, the pressure was reduced and heating continued for additional 5 minutes at a pressure of 0.1 kPa. Then, the pressure was released, and the ampule taken out and cooled to room temperature so that a brown solid was obtained. The product was completely soluble in 1-chloronaphthalene at 250° C. HPLC measurement revealed that the conversion ratio of the cyclic polyphenylene sulfide to PPS was 98.4%. The results are shown in Table 5.

GPC measurement revealed that the resulting powdery PPS had a weight average molecular weight of 80,000 and a dispersity of 2.41. The resulting product had a Na content of 3 ppm and exhibited a weight loss ratio on heating from 100° C. to 330° C. of 0.003%. The results were shown in Table 4.

Examples 14 to 16

Operations were carried out in the same manner as in Comparative Example 6 except for changing the raw materials as shown in Table 5 so that brown solids were obtained. The results are shown in Table 5.

Example 17

Operations were carried out in the same manner as in Comparative Example 6 except for changing the raw materials as shown in Table 5 and the polymerization condition was changed to a reduced pressure condition at 0.1 kPa for 60 minutes so that a brown solid was obtained. The results are shown in Table 5.

Comparative Example 7

Into a glass ampule was charged 2 g of the cyclic polyphenylene sulfide composition obtained in the Referential Example 4, and the inside of the ampule was flushed with nitrogen. The ampule was put in an electric furnace controlled to 340° C. After heating for 55 minutes, the pressure was reduced and heating continued for 5 minutes at a pressure of 0.1 kPa. Then, the pressure was released, and the ampule taken out and cooled to room temperature so that a brown solid was obtained. The results are shown in Table 5.

Examples 18, 19

Operations were carried out in the same manner as in Comparative Example 6 except for changing the raw materials as shown in Table 5 so that brown solids were obtained. The results are shown in Table 5.

Comparative Example 8

Into a glass test tube equipped with a distillation tube and a stirring blade was charged 100 g of the cyclic polyphenylene sulfide composition obtained in Referential Example 4. After pressure reduction and nitrogen flushing were repeated three times, the test tube was put in an electric furnace. After stirring under heating at 250° C. for 20 minutes, the temperature was raised to 340° C., followed by heating for 225 minutes. Then, the pressure was reduced and heating continued for additional 15 minutes at a pressure of 0.1 kPa. Then, the pressure was released, and the test tube taken out and cooled to room temperature so that a brown solid was obtained. The product was completely soluble in 1-chloronaphthalene at 250° C. The results are shown in Table 5.

Example 20

Operations were carried out in the same manner as in Comparative Example 8 except for changing the raw materials as shown in Table 5 so that brown solids were obtained. The results are shown in Table 5.

TABLE 5

| | Raw materials | | | | | Reaction conditions | | | | Characteristics of polyarylene sulfide | | | | |
|---|---|---|---|---|---|---|---|---|---|---|---|---|---|---|
| | Cyclic polyarylene sulfide composition (a) | | | Sulfide compound (b) | | Reaction tem- perature ° C. | Reaction time min | Reaction atmos- phere | Con- ver- sion ratio % | Molecular weight | | Na con- tent ppm | Weight loss ratio % | Func- tional group content mol % |
| | lot | Con- centra- tion | Charged amount | Kind | Added amount | | | | | Mw | Mw/ Mn | | | |
| Com- parative Exam- ple 6 | Referential Example 1 | 98% | 2 g | — | — | 340 | 55 + 5 | N2 + Vac | 98.4 | 80000 | 2.41 | 3 | 0.003 | <0.01 |
| Exam- ple 14 | Referential Example 1 | 98% | 2 g | BAPhS | 1.0 mol % | 340 | 55 + 5 | N2 + Vac | 97.6 | 31000 | 2.35 | 3 | 0.052 | 0.54 |
| Exam- ple 15 | Referential Example 1 | 98% | 2 g | BHPhS | 1.0 mol % | 340 | 55 + 5 | N2 + Vac | 98.1 | 44000 | 2.36 | 3 | 0.053 | 0.40 |
| Exam- ple 16 | Referential Example 1 | 98% | 2 g | TDSA | 1.0 mol % | 340 | 55 + 5 | N2 + Vac | 98.0 | 38000 | 2.32 | 3 | 0.070 | 0.18 |
| Exam- ple 17 | Referential Example 1 | 98% | 2 g | BHPhS | 15 mol % | 340 | 60 | Vac | 99.0 | 41000 | 2.37 | 3 | 0.055 | 0.89 |
| Com- parative Exam- ple 7 | Referential Example 4 | 78% | 2 g | — | — | 340 | 55 + 5 | N2 + Vac | 71.8 | 19000 | 1.65 | 470 | 0.118 | <0.01 |
| Exam- ple 18 | Referential Example 4 | 78% | 2 g | BAPhS | 1.0 mol % | 340 | 55 + 5 | N2 + Vac | 93.6 | 18000 | 2.01 | 470 | 0.030 | 0.24 |
| Exam- ple 19 | Referential Example 4 | 78% | 2 g | BHPhS | 1.0 mol % | 340 | 55 + 5 | N2 + Vac | 96.5 | 19000 | 2.26 | 470 | 0.051 | 0.22 |
| Com- parative Exam- ple 8 | Referential Example 4 | 78% | 100 g | — | — | 340 | 225 + 15 | N2 + Vac | 93.7 | 22000 | 2.00 | 470 | 0.032 | <0.01 |
| Exam- ple 20 | Referential Example 4 | 78% | 100 g | BAPhS | 1.0 mol % | 340 | 225 + 15 | N2 + Vac | 97.8 | 17000 | 2.10 | 470 | 0.071 | 0.25 |

BAPhS: Bis(4-aminophenyl) sulfide
BHPhS: Bis(4-hydroxyphenyl) sulfide
TDSA: Thiodisalicylic acid The results of Examples 14 to 20 show that desired reactive functional group-containing polyphenylene sulfides being narrow in molecular weight distribution and little in gas generation amount were obtained. Moreover, it is also shown that gas generation is reduced well by reducing pressure later under a nitrogen atmosphere in comparison to Examples 1 to 6 in which polymerization was performed under a nitrogen atmosphere.

The results of Comparative Example 7 and Examples 18 and 19 show that the conversion ratio was high in the case that a sulfide compound was added even though the reaction time was short.

Example 17 shows that a reactive functional group-containing polyphenylene sulfide can be used even though a reaction was performed directly under a reduced pressure condition, but the amount of reactive functional groups relative to the amount of the sulfide compound added became remarkably smaller in comparison to a normal pressure condition or a condition where the pressure was reduced after a reaction had been performed at a normal pressure. This suggests that the pressure reduction caused the sulfide compound to leak to the outside of the system. It is shown that performing a reaction under a normal pressure condition or performing a reaction under a normal pressure condition, followed by a reaction under a reduced pressure condition is more beneficial for increasing the content of reactive functional groups.

The results of Examples 18 to 20 show that the content of reactive functional groups in a resulting PPS polymer tends to decrease when the cyclic polyarylene sulfide concentration in a cyclic polyarylene sulfide (a) has decreased.

Comparative Example 9

Into a glass test tube equipped with a distillation tube and a stirring blade was charged 100 g of the cyclic polyphenylene sulfide composition obtained in Referential Example 4. After pressure reduction and nitrogen flushing were repeated three times, the test tube was put in an electric furnace. After stirring under heating at 250° C. for 20 minutes, the temperature was raised to 340° C., followed by heating for 330 minutes. Then, the pressure was reduced and heating continued for additional 30 minutes at a pressure of 0.1 kPa. Then, the pressure was released, and the test tube taken out and cooled to room temperature so that a brown solid was obtained. The results are shown in Table 6 below.

Examples 21 to 24

Operations were carried out in the same manner as in Comparative Example 8 except for changing the raw materials and the reaction conditions as shown in Table 6 so that brown solids were obtained. The results are shown in Table 6 below.

TABLE 6

| | Raw materials | | | | Reaction conditions | | | | Characteristics of polyarylene sulfide | | | | |
|---|---|---|---|---|---|---|---|---|---|---|---|---|---|
| | Cyclic polyarylene sulfide composition (a) | | Sulfide compound (b) | | Reaction tempera- | Reaction | Reaction | Con-version | Molecular weight | | Na con- | Weight loss | Func-tional group |
| lot | | Con-centra-tion | Charged amount | Kind | Added amount | ture °C. | time min | atmosphere | ratio % | Mw | Mw/Mn | tent ppm | ratio % | content mol % |
| Comparative Example 9 | Referential Example 4 | 78% | 100 g | — | — | 340 | 330 + 30 | N2 + Vac | 98.1 | 28000 | 2.20 | 470 | 0.028 | <0.01 |
| Example 21 | Referential Example 4 | 78% | 100 g | BAPhS | 1.0 mol % | 340 | 330 + 30 | N2 + Vac | 98.8 | 22000 | 2.30 | 470 | 0.036 | 0.25 |
| Example 22 | Referential Example 1 | 98% | 2 g | Referential Example 5 | 1.0 mol % | 340 | 115 + 5 | N2 + Vac | 98.1 | 35000 | 2.35 | 3 | 0.023 | 0.87 |
| Example 23 | Referential Example 4 | 78% | 2 g | Referential Example 5 | 1.0 mol % | 340 | 115 + 5 | N2 + Vac | 97.9 | 22000 | 2.18 | 470 | 0.048 | 0.55 |
| Example 24 | Referential Example 4 | 78% | 100 g | Referential Example 5 | 1.0 mol % | 340 | 330 + 30 | N2 + Vac | 98.8 | 23000 | 2.30 | 470 | 0.038 | 0.58 |

BAPhS: Bis(4-aminophenyl) sulfide

The results of Comparative Examples 8 and 9 show that the molecular weight of a resulting PPS polymer increased by increasing the conversion ratio by lengthening the polymerization time.

Moreover, it is also shown that the use of a sulfide compound oligomer increased the functional group content of a resulting PPS polymer more efficiently and, as a result, the efficiency of functional group introduction has increased.

Example 25

Into a 1-liter autoclave were charged 50 g of the PPS obtained in Example 21 and 500 ml of N-methylpyrrolidone and stirred at 230° C. for 30 minutes. The resulting slurry was filtered and the collected matter subjected to NMP washing three times, water washing three times, and further methanol rinsing and then vacuum dried at 150° C. for 6 hours, affording powdery PPS. The resulting powdery PPS had a weight average molecular weight of 22,000 and a dispersity of 2.24. MFR measurement of the powdery PPS was carried out under the same conditions as Comparative Example 4. The MFR was 6690 g/10 minutes. The results are shown in Table 7.

Example 26

MFR measurement was carried out under the same conditions as Example 25 except for dry blending KBM303 to powdery PPS. The MFR was 6250 g/10 minutes and the thickening ratio to Example 25 was 1.07. The results are shown in Table 7.

Example 27

MFR measurement was carried out under the same conditions as Example 25 except for dry blending KBE9007 to powdery PPS. The MFR was 4520 g/10 minutes and the thickening ratio to Example 25 was 1.48. The results are shown in Table 7.

Example 28

Into a 1-liter autoclave were charged 50 g of the PPS obtained in Example 24 and 500 ml of N-methylpyrrolidone and stirred at 230° C. for 30 minutes. The resulting slurry was filtered and the collected matter subjected to NMP washing three times, water washing three times, and further methanol rinsing and then vacuum dried at 150° C. for 6 hours, affording powdery PPS. The resulting powdery PPS had a weight average molecular weight of 23,000 and a dispersity of 2.28. MFR measurement of the powdery PPS was carried out under the same conditions as Comparative Example 4. The MFR was 6510 g/10 minutes. The results are shown in Table 7.

Example 29

MFR measurement was carried out under the same conditions as Example 28 except for dry blending KBM303 to powdery PPS. The MFR was 4280 g/10 minutes and the thickening ratio to Example 28 was 1.52. The results are shown in Table 7.

Example 30

MFR measurement was carried out under the same conditions as Example 28 except for dry blending KBE9007 to powdery PPS. The MFR was 5920 g/10 minutes and the thickening ratio to Example 28 was 1.10. The results are shown in Table 7.

TABLE 7

|  | PPS lot | Sulfide compound | | Silane coupling agent | | MFR | Thickening ratio |
| --- | --- | --- | --- | --- | --- | --- | --- |
|  |  | Kind | Added amount | Kind | Added amount | g/10 min | times |
| Example 25 | Example 21 | BAPhS | 1.0 mol % | — | — | 6690 | 1.00 |
| Example 26 | Example 21 | BAPhS | 1.0 mol % | KBM303 | 0.5 wt % | 6250 | 1.07 |
| Example 27 | Example 21 | BAPhS | 1.0 mol % | KBE9007 | 0.5 wt % | 4520 | 1.48 |
| Example 28 | Example 24 | Referential Example 5 | 1.0 mol % | — | — | 6510 | 1.00 |
| Example 29 | Example 24 | Referential Example 5 | 1.0 mol % | KBM303 | 0.5 wt % | 4280 | 1.52 |
| Example 30 | Example 24 | Referential Example 5 | 1.0 mol % | KBE9007 | 0.5 wt % | 5920 | 1.10 |

BAPhS: Bis(4-aminophenyl) sulfide

The results of Examples 25 to 30 show that when a silane coupling agent (KBE9007) having an isocyanate group that exhibits high reactivity to an amino group and low reactivity to a carboxyl group was used, the thickening ratio of the PPS using a PPS in which an amino group had been introduced was higher (Example 27) and the thickening ratio of the PPS in which a carboxyl group had been introduced was lower (Example 30).

Similarly, when a silane coupling agent (KBM303) having a cyclohexyl-based epoxy group that exhibits high reactivity to a carboxyl group and low reactivity to an amino group was used, the thickening ratio of the PPS using a PPS in which a carboxyl group had been introduced was higher (Example 29) and the thickening ratio of the PPS in which an amino group had been introduced was lower (Example 26). These results also show that desired functional groups were introduced into a PPS.

INDUSTRIAL APPLICABILITY

It is possible to provide an industrially useful polyarylene sulfide having narrow molecular weight distribution, having low gassing property, high molecular weight, and high purity, and having functional groups.

Polyarylene sulfides obtained by the production method have excellent processability and therefore can be applied to various melt molding processes such as injection, extrusion, blowing, and compression.

The invention claimed is:
1. A polyarylene sulfide comprising 0.01 to 5 mol %, per mol of arylene sulfide structural units, of a function group selected from the group consisting of an amino group, a carboxyl group, a hydroxyl group, an acid anhydride group, an isocyanate group, an epoxy group, a silanol group, and an alkoxysilane group having a dispersity represented by (weight average molecular weight)/(number average molecular weight) of 2.5 or less and a weight loss ratio at 100° C. to 330° C. of 0.2% by weight or less when the polyarylene sulfide is subjected to thermogravimetric analysis from 50° C. to 340° C. at a temperature ramp-up rate of 20° C./min under a non-oxidative atmosphere of normal pressure, and having an alkali metal content of 100 ppm or less.

* * * * *